United States Patent
Lee et al.

(10) Patent No.: US 12,034,479 B2
(45) Date of Patent: Jul. 9, 2024

(54) METHOD FOR RECEIVING SIGNAL IN WIRELESS OPTICAL COMMUNICATION SYSTEM, AND RECEIVING TERMINAL THEREFOR

(71) Applicant: LG Electronics Inc., Seoul (KR)

(72) Inventors: Hojae Lee, Seoul (KR); Sangrim Lee, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 17/773,989

(22) PCT Filed: Nov. 4, 2019

(86) PCT No.: PCT/KR2019/014830
§ 371 (c)(1),
(2) Date: May 3, 2022

(87) PCT Pub. No.: WO2021/090962
PCT Pub. Date: May 14, 2021

(65) Prior Publication Data
US 2022/0385360 A1    Dec. 1, 2022

(51) Int. Cl.
*H04B 10/11*    (2013.01)

(52) U.S. Cl.
CPC .................... *H04B 10/11* (2013.01)

(58) Field of Classification Search
CPC .... H04B 10/11; H04B 10/613; H04B 10/671; H04B 10/1123; H04B 10/6165; H04B 10/697; H04J 14/04

USPC .......................................................... 398/118
See application file for complete search history.

(56) References Cited

U.S. PATENT DOCUMENTS

| | | | |
|---|---|---|---|
| 8,244,137 B1* | 8/2012 | Chen ................. | H04B 10/1141 398/118 |
| 9,442,246 B2* | 9/2016 | Brunet .................. | G02B 6/028 |
| 10,969,571 B2* | 4/2021 | Swanson ............ | G01B 9/02004 |
| 2014/0126902 A1* | 5/2014 | Swanson ............. | H04B 10/616 398/43 |
| 2015/0104139 A1* | 4/2015 | Brunet ............... | G02B 6/03666 385/124 |

(Continued)

FOREIGN PATENT DOCUMENTS

| CN | 105282630 A | * 1/2016 | |
|---|---|---|---|
| CN | 107113059 A | * 8/2017 | ......... H04B 10/5161 |

(Continued)

*Primary Examiner* — Abbas H Alagheband
(74) *Attorney, Agent, or Firm* — BRYAN CAVE LEIGHTON PAISNER LLP

(57) ABSTRACT

Proposed is a receiving UE for receiving a signal in optical wireless communication, according to the present disclosure. The receiving UE may include: a transceiver for receiving an optical signal of an orbital angular momentum (OAM) mode from a transmitting terminal; a demodulator composed of at least one phase shifter; a photoelectricity converter composed of at least one photodiode; and a processor connected to the transceiver, the demodulator, and the photoelectricity converter. In addition, the at least one phase shifter may convert an optical signal of the OAM mode into an optical signal of a Gaussian mode, and the at least one photodiode may convert an optical signal of the Gaussian mode into an electrical signal.

12 Claims, 47 Drawing Sheets

(56) References Cited

U.S. PATENT DOCUMENTS

| | | | | |
|---|---|---|---|---|
| 2015/0326313 | A1* | 11/2015 | Brouillet | H04B 10/11 398/131 |
| 2016/0043794 | A1* | 2/2016 | Ashrafi | H04L 27/2017 370/329 |
| 2016/0204896 | A1* | 7/2016 | Yu | H04B 10/11 398/65 |
| 2016/0212510 | A1* | 7/2016 | Bogoni | H04Q 11/0005 |
| 2017/0012732 | A1* | 1/2017 | Kowalevicz | H01Q 21/20 |
| 2017/0237485 | A1 | 8/2017 | Wood et al. | |
| 2017/0343791 | A1* | 11/2017 | Swanson | G02B 23/24 |
| 2017/0366270 | A1* | 12/2017 | Ashrafi | H04L 27/38 |
| 2018/0234236 | A1* | 8/2018 | Djordjevic | H04B 10/516 |
| 2019/0028165 | A1* | 1/2019 | Adachi | H04B 7/0617 |
| 2020/0274614 | A1* | 8/2020 | Sondericker, III | H04B 10/116 |
| 2021/0021053 | A1* | 1/2021 | Sasaki | H04B 7/0848 |

FOREIGN PATENT DOCUMENTS

| | | | | |
|---|---|---|---|---|
| CN | 111211843 A | * | 5/2020 | G02B 27/0012 |
| JP | 2018157117 A | | 10/2018 | |
| WO | 2016049502 A1 | | 3/2016 | |
| WO | WO-2016049502 A1 | * | 3/2016 | G02B 26/0833 |

* cited by examiner

SPP

Controlling the delay time for the path

SPP                    Photodiode

SPP   Photodiode Array

METHOD FOR RECEIVING SIGNAL IN WIRELESS OPTICAL COMMUNICATION SYSTEM, AND RECEIVING TERMINAL THEREFOR

This application is the National Stage filing under 35 U.S.C. 371 of International Application No. PCT/KR2019/014830 filed on Nov. 4, 2019, the contents of which are all hereby incorporated by reference herein in their entirety.

TECHNICAL FIELD

The present disclosure relates to a method of receiving a signal in an optical wireless communication system and receiving user equipments (UEs) therefor, and more particularly, to a method of receiving a signal based on the characteristics of orbital angular momentum (OAM).

BACKGROUND ART

Optical wireless communication systems may be largely divided into visible light communication (VLC) systems and free-space optical (FSO) communication systems according to the frequency and purpose of photons.

VLC plays the role of lighting and communication at the same time.

Information is transmitted by visible light, which may depend on the intensity of the light or the blinking of the light. To this end, visible light devices such as a light emitting diode (LED) is commonly used.

Free space optical (FSO) communication mainly plays the role of communication and is usually used in a free space environment or an environment where signal straightness is guaranteed. The FSO communication also covers ultraviolet (UV) and infrared (IR) light as well as visible light. Unlike VLC, FSO communication is not involved in lighting, so there are no restrictions on lighting. In general, not only LEDs but also devices based on the straightness of light such as light amplification by stimulated emission of radiation (LASER) are used.

Meanwhile, there is a need for a method for efficiently receiving signals transmitted based on an orbital angular momentum (OAM) of photons in optical wireless communication.

DISCLOSURE

Technical Problem

An object of the present disclosure is to provide a receiving user equipment (UE) including a demodulator composed of at least one phase shifter and an optical-to-electrical (O-to-E) converter composed of at least one photodiode, and a method for efficiently receiving a signal by the receiving UE.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a receiving user equipment (UE) for receiving a signal in optical wireless communication may include a transceiver configured to receive an optical signal of an orbital angular momentum (OAM) mode from a transmitting user equipment (UE); a demodulator composed of at least one phase shifter; an optical-to-electrical (O-to-E) converter composed of at least one photodiode; and a processor connected to the transceiver, the demodulator, and the optical-to-electrical (O-to-E) converter, wherein the at least one phase shifter converts the optical signal of the OAM mode into an optical signal of a Gaussian mode; and the at least one photodiode converts the optical signal of the Gaussian mode into an electrical signal.

The at least one phase shifter may be a phase shifter array that forms respective regions in the demodulator, wherein the phase shifter array individually controls the optical signals of the OAM mode reaching the respective regions.

The at least one photodiode may be a photodiode array that forms respective regions in the optical-to-electrical (O-to-E) converter, wherein respective electrical signals converted through the photodiode array are summed and processed by the processor.

The receiving UE may further include an orbital angular momentum (OAM) demultiplexer, wherein the OAM demultiplexer performs beam split of the optical signal such that each of the demodulator and the optical-to-electrical (O-to-E) converter decodes at least one OAM mode applied to the optical signal.

The receiving UE may further include a phase error corrector, wherein the phase error corrector compensates for a change in wavefront of the optical signal received through the transceiver.

The receiving UE may further include an average interference tracker (AIT), wherein the average interference tracker (AIT) measures interference generated in the electrical signal converted through the optical-to-electrical (O-to-E) converter, and removes the measured interference from the electrical signal.

The receiving UE may further include a laser oscillator configured to generate a reference optical resource of a frequency promised with the transmitting UE; and a coupler configured to mix and branch the reference optical resource and the optical signal, wherein the at least one photodiode outputs a difference in current between optical signals branched by the coupler.

Advantageous Effects

As is apparent from the above description, the receiving UE configured to receive signals in an optical wireless communication system according to the embodiments of the present disclosure can more efficiently receive an optical signal of the orbital angular momentum (OAM) mode through the demodulator composed of at least one phase shifter and an optical-to-electrical (O-to-E) converter composed of at least one photodiode.

The above-described aspects of the present disclosure are merely some of the preferred embodiments of the present disclosure, and various embodiments reflecting the technical features of the present disclosure may be derived and understood by those skilled in the art based on the following detailed description of the disclosure.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE

Figure 1:
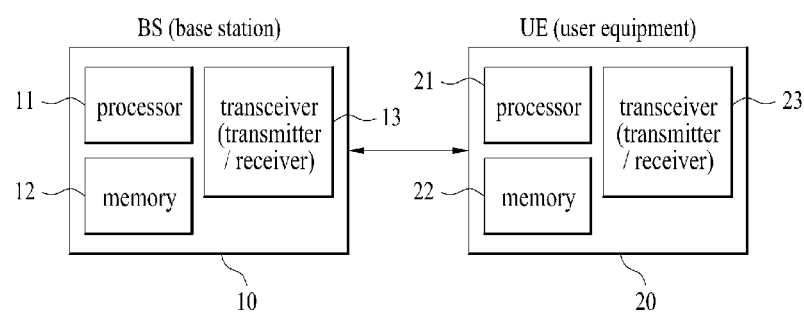
FIG. 1 is a diagram illustrating an exemplary system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes the 3GPP LTE and LTE-A and 5G systems, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of its transmitted or received information.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a system for implementing the present disclosure.

Referring to FIG. 1, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals. The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals. The BS 10 and/or the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

The present disclosure proposes various new frame structure for a 5th generation (5G) communication system. In the next generation 5G system, communication scenarios are classified into Enhanced Mobile Broadband (eMBB), Ultra-reliability and low-latency communication (URLLC), Massive Machine-Type Communications (mMTC), etc. Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

Figure 2:
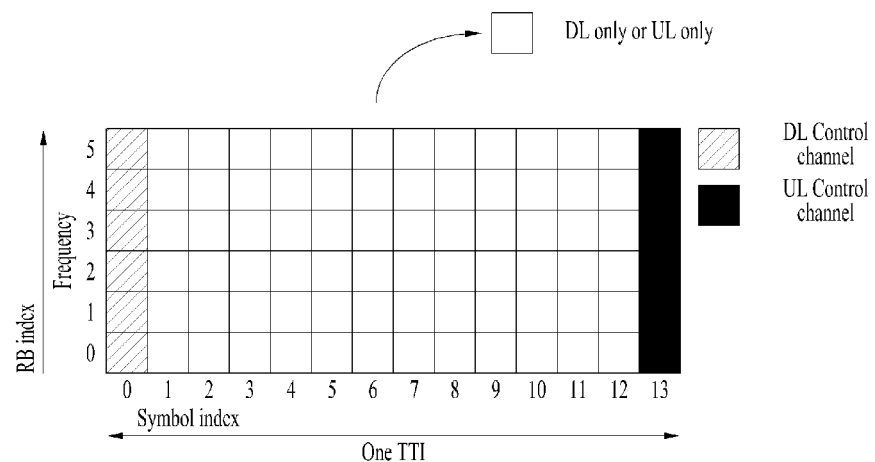
FIG. 2 is a diagram illustrating an exemplary subframe structure in which a data channel and a control channel are multiplexed in time division multiplexing (TDM).

FIG. 2 is a diagram illustrating an exemplary subframe structure in which a data channel and a control channel are multiplexed in time division multiplexing (TDM). In 5G NR, a frame structure in which a control channel and a data channel are multiplexed according to TDM like FIG. 2 may be considered in order to minimize latency.

In FIG. 2, the hatched area represents a transmission region of a DL control channel carrying DCI (e.g., PDCCH), and the last symbol represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 2, blank areas are available for flexible configuration of DL or UL periods to achieve DL/UL flexibility. For example, a blank area may be used as a data channel for DL data transmission (e.g., a physical downlink shared channel (PDSCH)) or a data channel for UL data transmission (e.g., a physical uplink shared channel (PUSCH)). This structure is characterized in that since a DL transmission and a UL transmission may be performed sequentially in one subframe, an eNB may transmit DL data in the subframe to a UE and receive an HARQ ACK/NACK signal for the DL data in the subframe from the UE. That is, the time required to retransmit data when a data transmission error occurs may be reduced, thereby minimizing the latency of final data transmission.

In the self-contained subframe structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the self-contained subframe structure.

In the case of an optical wireless communication system, there are generally single carrier modulation (SCM) methods based on on-off keying (OOK) that represents signals based on flickering of visible light. In OOK modulation, digital signals 1 and 0 can be expressed according to ON and OFF states of the light source. OOK modulation can be modified by a modulation scheme such as pulse position modulation (PPM) which modulates an input signal into a clock-based pulse position.

Regarding the visible light communication system, research on multi-carrier modulation (MCM) schemes have been conducted. Compared to the single carrier modulation scheme, the MCM scheme is robust to multipath, and enables operation of a single tap equalizer. It is also robust to DC wandering and flickering interference. The MCM-based waveform for VLC must satisfy the conditions that i) it has only one dimension (real-value) signal and ii) it has unipolar characteristics.

Figure 3:
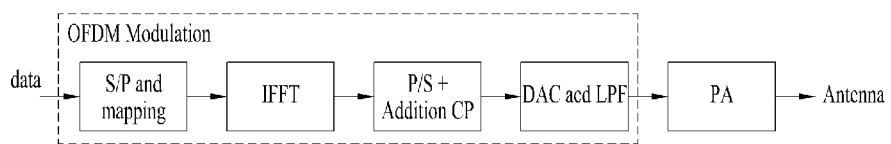
FIG. 3 is a diagram illustrating the OFDM modulation structure at the transmitting side of the conventional RF communication system.

FIG. 3 is a diagram illustrating the OFDM modulation structure at the transmitting side of the RF communication system. Referring to FIG. 3, an analog signal obtained through OFDM modulation is amplified through an RF power amplifier (PA). In this case, the maximum amplified magnitude of the signal may be limited by the performance limit of the PA.

Figure 4:
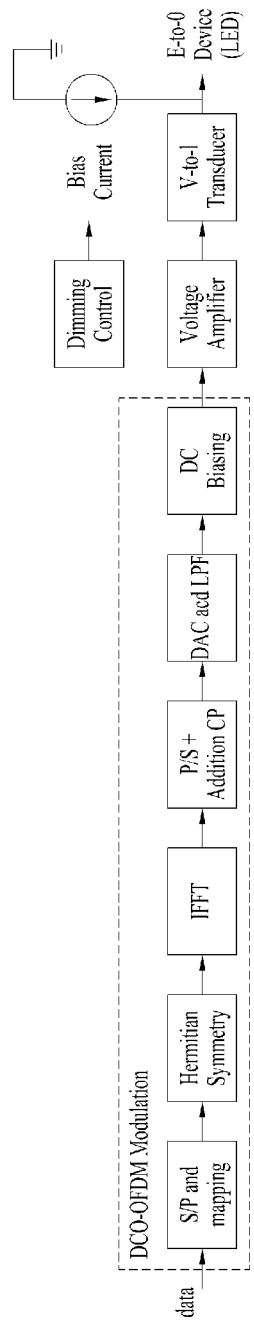
FIGS. 4 to 5 are diagrams illustrating the structure of a multi-carrier modulation transmitter of a visible light communication system.
Figure 5:
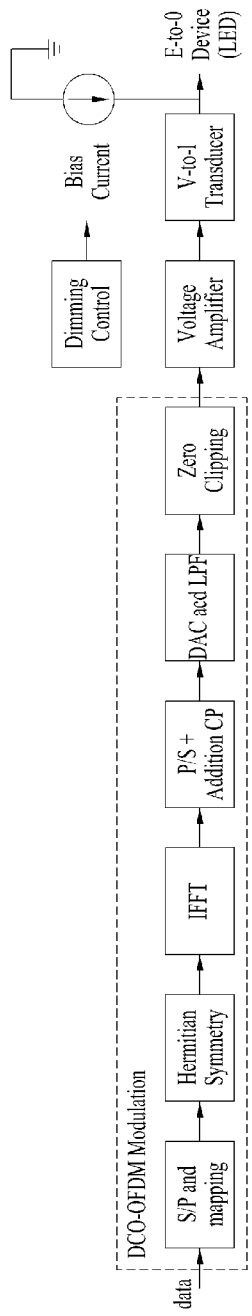

On the other hand, the structure of a multi-carrier modulation transmitter of the visible light communication system as shown in FIGS. 4 to 5. More specifically, FIG. 4 shows the structure of a DCO-OFDM modulation transmitter of the VLC communication system, and FIG. 5 shows the structure of an ACO-OFDM modulation transmitter of the VLC communication system. In FIGS. 4 and 5, when an electrical-to-optical (E-to-O) device designed to use a band (e.g., an infrared band) other than visible light such as laser light emitted from LEDs is used in the edge device, the above-described situation may correspond to the range of free space optical communication.

Figure 6:
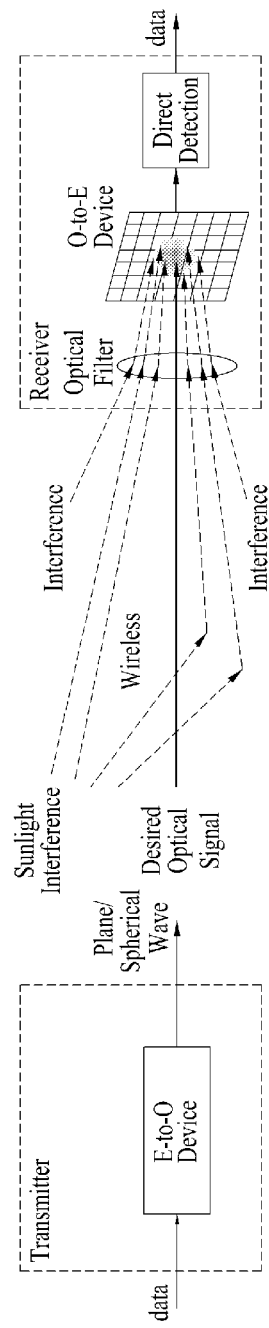
FIGS. 6 to 8 are diagrams illustrating examples of an optical wireless communication system.

FIG. 6 is a diagram illustrating a basic structure of an optical wireless communication system. In the basic structure of FIG. 6, the transmitter may transmit radio light, and the receiver may decode the radio light.

Referring to FIG. 6, the transmitter converts data to be transmitted (e.g., electrical signal) into a photon (optical) source by an electrical-to-optical (E-to-O) device and transmits the photon source to the receiver in a wireless environment. The photon source may be referred to as radio light.

Here, the radio light may be interpreted as a wave corresponding to a set of photons and classified into a plane wave and a spherical wave according to the shape of a wavefront. The plane wave refers to a wave with a straight or planar wavefront. For example, the plane wave may be artificially generated by resonance as in a laser beam. The spherical wave refers to a wave in which the wavefront forms a concentric spherical surface around a wave source when the wave source is a point in space. When the spherical wave propagates away, wavefronts are almost parallel to each other, so that the spherical wave may be regarded as the plane wave from the viewpoint of the receiver.

When the receiver receives a desired optical signal including data in a wireless environment, the receiver may receive i) interference from other sources and ii) solar interference from the sun along with the desired optical signal. The receiver may decode the desired optical signal into the data based on i) an optical filter for determining the radio light used for the desired optical signal, ii) an O-to-E device that converts the receiver radio light into an electrical signal, and iii) direct detection for analyzing the signal.

Figure 7:
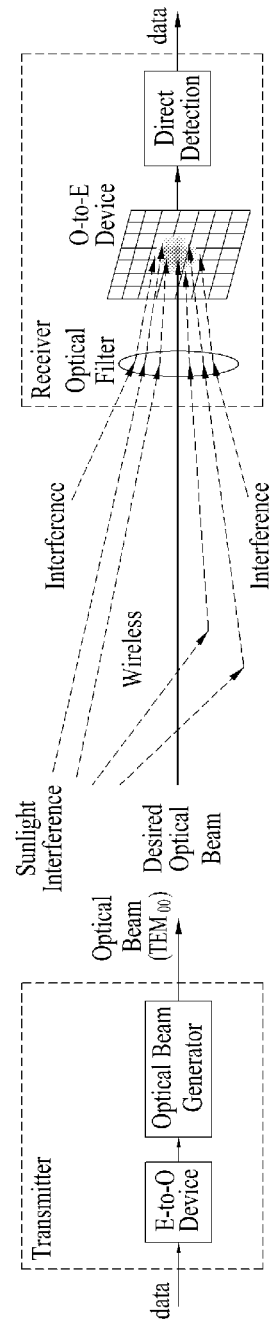

On the other hand, according to an example or implementation of the present disclosure shown in FIG. 7, the transmitter may transmit to the receiver in a wireless environment by i) converting data to be transmitted (e.g., electrical signal) into a photon source with an E-to-O device and ii) generating an optical beam with an optical beam generator.

In optics, radio light may be represented as a beam. In an example or implementation of the present disclosure, a case in which an optical beam is configured based on a transverse electromagnetic field/wave (TEM) mode corresponding to a resonant mode among transverse modes of electromagnetic radiation will be described.

The TEM mode may be divided into TEMlm by indices l and m according to beam formation. In general, the basic form of the TEM mode is a Gaussian beam, which is represented by TEM00. TEM00 refers to an optical beam in which a wave amplitude distribution on a cross-section perpendicular to an optical axis is expressed by a Gaussian function.

When the receiver receives a desired optical beam including data in a wireless environment, the receiver may receive i) interference from other sources and ii) solar interference from the sun along with the desired optical signal. The receiver may decode the desired optical beam into the data based on i) an optical filter for determining the radio light used for the desired optical beam, ii) an O-to-E device that converts the receiver radio light into an electrical signal, and iii) direct detection for interpreting the signal.

Next, initial access based on legacy links and initial access based on broadcast messages will be described.

1.1. Initial Access Based on Legacy Link

A transmitting UE and receiving UE may share initial information for optical wireless communication through legacy links (e.g., LTE, LTE-A, NR, WiFi, Bluetooth, etc.). The initial information for optical wireless communication may include the following.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an on/off keying (OOK) method may be used for single carrier modulation, or ii) an orthogonal frequency-division multiplexing (OFDM) method may be used as for multi-carrier modulation, which may be agreed between the transmitting UE and receiving UE.

1.2. Initial Access Based on Broadcast Message

A transmitting UE and receiving UE may share initial information based on broadcast messages. For example, the transmitting UE and receiving UE may broadcast a predetermined broadcast message on an optical or radio resource as in broadcast over a physical broadcast channel (PBCH) or common control channel of LTE/LTE-A in order to share the initial information for optical wireless communication. The initial information for optical wireless communication may be as follows.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an OOK method may be used for single carrier modulation, or ii) an OFDM method may be used as for multi-carrier modulation, which may be agreed between the transmitting UE and receiving UE.

2.1. Next, "Optical Wireless Broadband Communication Transmitter and Receiver Based on Photon OAM" will be described in detail.

Figure 8:
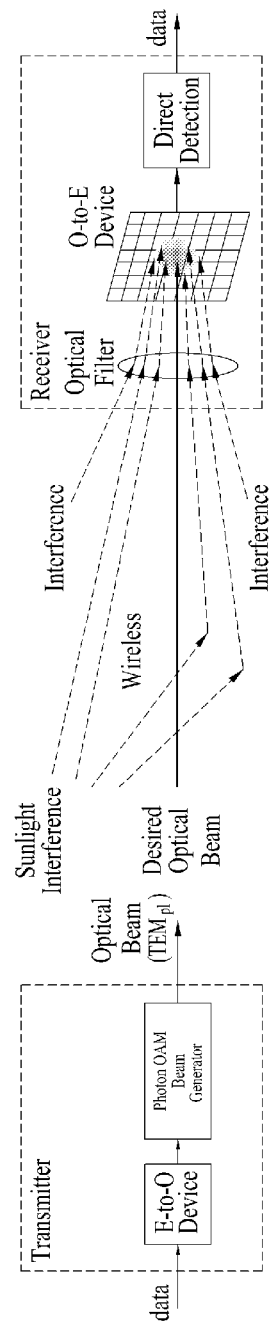

In an example or implementation of the present disclosure shown in FIG. 8, proposed is a system including: i) a transmitting UE transmitting a signal based on a photon OAM beam generator; and ii) a receiving UE using an optical filter for distinguishing a desired OAM beam from optical interference. According to the proposed system, it is possible to minimize interference from sunlight or other sources having the same band and same polarization as those of a desired optical beam.

If radio light is interpreted as an electromagnetic wave, the TEM mode may be classified depending on to the shape of a beam. The basic form of the TEM mode is generally a Gaussian beam, which is represented by $TEM_{00}$. Hermite-Gaussian (HG) modes with rectangular transverse mode patterns are represented by $TEM_{mn}$. LG modes with cylindrical transverse mode patterns are represented by $TEM_{pl}$. In an example or implementation of the present disclosure, the LG modes ($TEM_{pl}$) may be represented by photon OAM.

2.2. Transmitting UE

A transmitting UE may convert an electric source including data to be transmitted into an optical source with an E-to-O device. The converted optical source may be converted into a photon OAM beam by a photon OAM beam generator as follows.

i) The transmitting UE may convert the optical source into a Gaussian beam ($TEM_{00}$) by passing the optical source through a resonator and then convert the Gaussian beam into the photon OAM beam ($TEM_{pl}$) with a spiral phase plate.

ii) The transmitting UE may convert the optical source to a Gaussian beam ($TEM_{00}$) by passing the optical source through a resonator, and convert the Gaussian beam into the photon OAM beam ($TEM_{pl}$) by reflecting the Gaussian beam on a phase hologram with a spiral phase pattern.

iii) The transmitting UE may convert the optical source to a Gaussian beam ($TEM_{00}$) by passing the optical source through a resonator and convert the Gaussian beam into the photon OAM beam ($TEM_p i$) by reflecting the Gaussian beam on a phase hologram with a fork diffraction pattern.

iv) The transmitting UE may convert the optical source to a Hermite-Gaussian beam ($TEM_{mn}$) by passing the optical source through a resonator and convert the Hermite-Gaussian beam into the photon OAM beam ($TEM_{pl}$) by passing the Hermite-Gaussian beam through a cylindrical lens HG-LG mode converter (e.g., pi/2 mode converter).

In addition to methods i) to iv) described above, various methods capable of generating a photon OAM beam may be applied to examples or implementations of the present disclosure.

2.3. Receiving UE 2.3.1. Optical Filter

An optical filter provided in a receiving UE may include a general optical filter or a polarizing filter. The general optical filter is an optical element for receiving a band corresponding to a desired optical beam. The optical filter may include a filter that transmits with a constant transmittance regardless of wavelengths, a correction filter that controls light intensity in a specific wavelength range, and a light contrast filter. The optical filter may be classified into an infrared range filter, a visible range filter, an ultraviolet range filter, a vacuum ultraviolet range filter, and so on depending on frequency ranges. Filters in each range may have different materials and structures.

Alternatively, the optical filter may be a polarized light filter (polarization filter). The polarization filter is a filter based on polarization, i.e., a filter for passing only light vibrating in a specific direction in order to receive polarized light corresponding to a desired optical beam. In general, polarization mainly occurs when obliquely projection light is reflected from a uniform surface. Therefore, if the polarization filter is used to block light reflected from the surface of a glass window or object, a clear and sharp image may be obtained. For example, a camera has a polarization filter capable of adjusting and rotating a polarization direction. If an autofocus camera uses the polarization filter, the autofocus camera may not recognize light and thus lose a focus because only wavelengths vibrating in one direction remain. A solution to this phenomenon is a circular polarization filter.

2.3.2. Lens

A lens is a device for focusing a received optical source to a focal point based on the effect of refraction.

2.3.2.1. Focal Point Control Based on Wavelength

Figure 9:
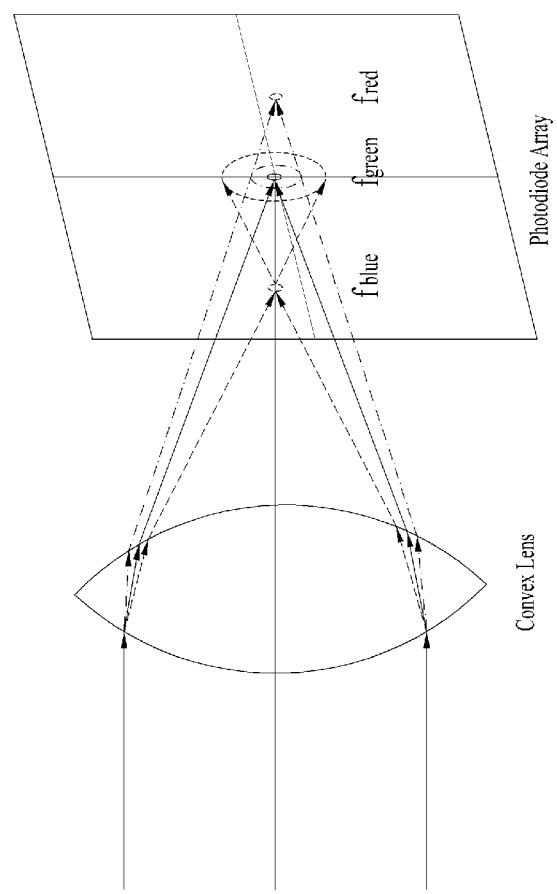
FIGS. 9 to 13 are diagram illustrating an optical filter applicable to an optical wireless communication system and a method for acquiring a desired beam using the optical filter.

Referring to FIG. 9, an optical source passing through a convex lens or a Fresnel lens has different focal points depending on wavelengths. Based on this characteristic, the receiving UE may control the intensity concentration of the optical source received on a photodiode array. The photodiode array according to an example or implementation of the present disclosure refers to an array in which a plurality of light receiving elements performing O-to-E conversion are distributed in a specific area.

For example, when the focal point of green light is denoted by $f_{green}$ in FIG. 9, the focal points of blue light and red light are $f_{blue}$ and $f_{red}$, respectively. It may be seen that the blue light, green light, and red light have different focal points. Based on this characteristic, the receiving UE may control the intensity of green light to be concentrated at the center of the photodiode array, the intensity of red light to spread over a larger area, and the intensity of blue light to spread over a further larger area.

Based on the above control, the receiving UE may receive a green light signal at the focal point of the green light more efficiently. The receiving UE may control focal points depending on wavelengths by i) controlling the thickness of the convex lens or Fresnel lens or ii) controlling the distance between the convex lens and the photodiode array.

2.3.2.2. Focal Point Control Based on OAM Mode

Figure 10:
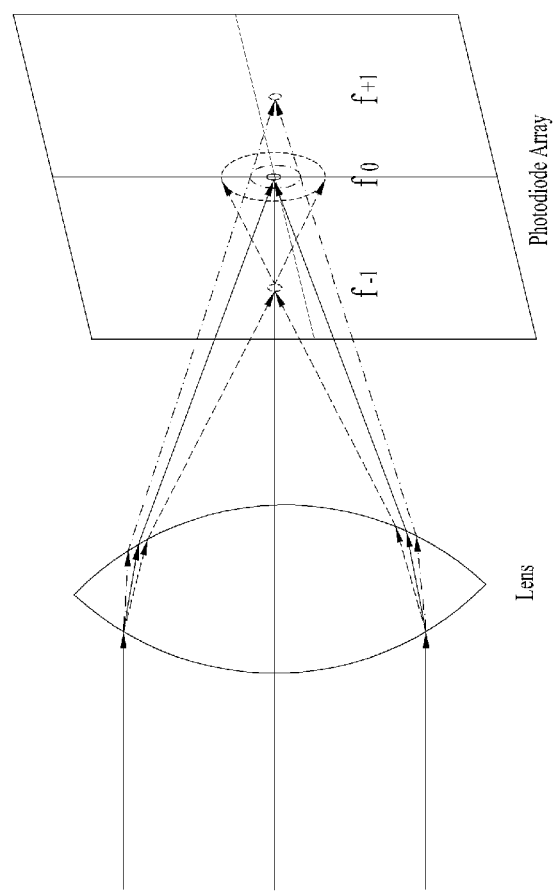

Referring to FIG. 10, an OAM optical source passing through a lens with an arbitrary refraction angle (e.g., Fresnel lens) has different focal points depending on mode indexes. Based on this characteristic, the receiving UE may control the intensity concentration of OAM modes received on the photodiode array.

For example, it may be seen from FIG. 10 that OAM mode +1, OAM mode 0, and OAM mode −1 have different focal points. In OAM mode 0, the receiving UE may control the intensity to be concentrated at the center of the photodiode array. In OAM mode −1, the receiving UE may control the intensity to spread over a larger area. In OAM mode +1, the receiving UE may control the intensity to spread over a further larger area.

When the focal point of OAM mode 0 is $f_0$, the focal point of mode index m, $f_m$ may be approximated as follows: $f_m = f_0(1+C \cdot m)$, where constant C is an OAM dispersion coefficient.

The receiving UE may control the focal points of OAM modes by i) controlling the thickness of the lens or Fresnel lens or ii) controlling the distance between an arbitrary lens and the photodiode array.

2.3.3. Fresnel Zone Plate

A Fresnel zone plate is a device for focusing a received optical source to a focal point based on the effect of diffraction. Specifically, the zone plate or Fresnel zone plate is a device for focusing materials with light or wave characteristics. Unlike lenses or curved mirrors, the zone plate may use diffraction instead of reflection and refraction. The zone plate consists of a set of radially symmetric rings that alternate between opaque and transparent areas, which is known as a Fresnel zone. Light hitting the zone plate is diffracted around an opaque area. The areas may be spaced apart so that diffracted light structurally interferes at a desired focal point to produce an image.

Figure 11:
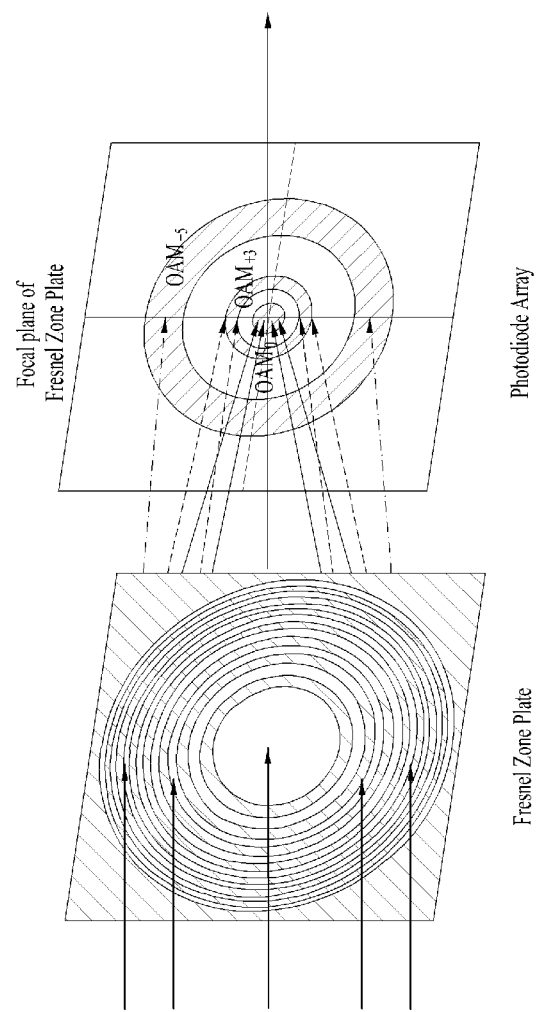

It may be seen from FIG. 11 that an optical source passing through the Fresnel zone plate have different wave characteristics or have different intensity distributions in a focal plane depending on OAM mode indexes. Based on these characteristics, the receiving UE may control the intensity distribution of the optical source received on the photodiode.

Referring to FIG. 11, when the optical source passing through the Fresnel zone plate is i) natural light such as sunlight or ii) plane wave light such as linearly polarized light or circularly polarized light, the intensity thereof may be concentrated at the center of the focal plane of the Fresnel zone plate.

When the optical source passing through the Fresnel zone plate is a plane wave light beam and a Gaussian beam, the intensity of the optical source may be distributed with a Gaussian distribution with respect to the center of the photodiode, which is located at the focal plane of the Fresnel zone plate.

When the optical source passing through the Fresnel zone plate is an LG beam corresponding to helical wave light, the intensity may be distributed in the form of a ring with respect to the center of the photodiode located at the focal plane of the Fresnel zone plate while maintaining the characteristics of an OAM state.

For example, in FIG. 11, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring, In OAM mode +5, the receiving UE may control the intensity to spread over a further larger area in the form of a ring. In this case, for general plane wave light such as i) natural light such as sunlight and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode by i) controlling a pattern according to the ring configuration of the Fresnel zone plate or ii) controlling the distance between the Fresnel zone plate and the photodiode.

2.3.4. Photon Sieve

A photon sieve is a device for focusing a received optical source to a focal point based on diffraction and interference effects. The photon sieve may include a flat sheet filled with pinholes arranged in a pattern similar to the ring of the Fresnel zone plate described above. The photon sieve may provide a much sharper focal point than the zone plate. The photon sieve is manufactured to include pinholes with various sizes and patterns and the characteristics of the focal point operation may vary depending on applications, so that the photon sieve may be used in various ways.

The receiving UE may control the intensity distribution of the optical source received on the photodiode based on i) wave characteristics of the optical source passing through the photon sieve or ii) the characteristic that the intensity distribution at the focal plane varies according to the OAM mode index.

When the optical source passing through the photon sieve is i) natural light such as sunlight or ii) plane wave light such as linearly or circularly polarized light, the intensity of the optical source may be concentrated at the center of the photodiode array located at the focal plane of the photon sieve.

When the optical source passing through the photon sieve is a plane wave light beam and a Gaussian beam, the intensity of the optical source is distributed with a Gaussian distribution with respect to the center of the photodiode array located at the focal plane of the photon sieve.

When the optical source passing through the photon sieve is an LG beam corresponding to helical wave light, the intensity may be distributed in the form of a ring with respect to the center of the photodiode array located at the focal plane of the photon sieve while maintaining the characteristics of an OAM state.

Figure 12:
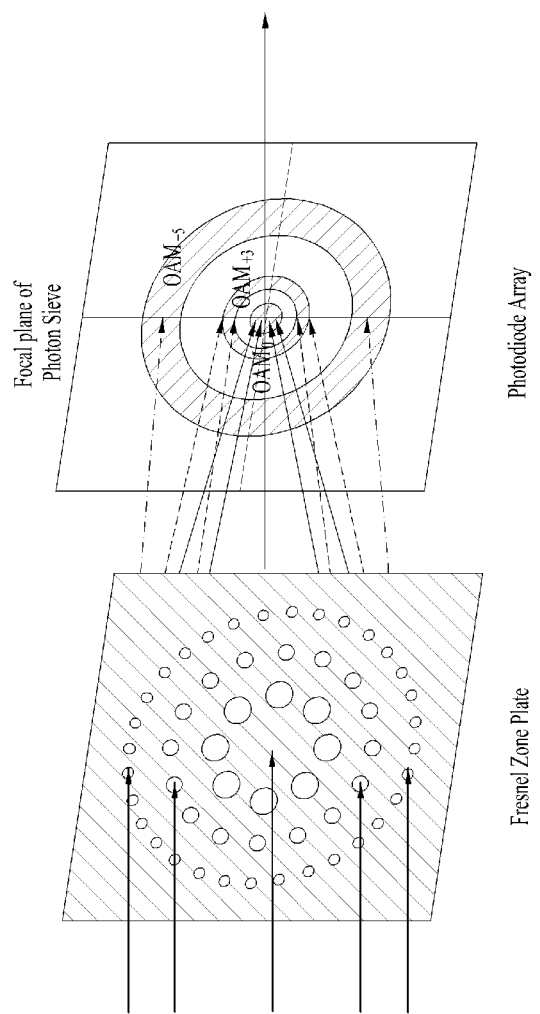

For example, in FIG. 12, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring, In OAM mode +5, the receiving UE may control the intensity to spread over a further larger area in the form of a ring. In this case, for general plane wave light such as i) natural light such as sunlight, and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode array by i) controlling a pattern according to the pinhole configuration of the photon sieve or ii) controlling the distance between the photon sieve and the photodiode array.

2.3.5. Phase Mask

A phase mask is a device for controlling a propagation direction according to the characteristics of a received optical source based on the effect of diffraction. The phase mask may include optical elements.

The receiving UE may control the position of the intensity distribution of the optical source received on the photodiode array based on i) the wave characteristics of the optical source passing through the phase mask (or pattern mask) or ii) the characteristic that the propagation direction of a beam changes depending on the OAM mode index.

Figure 13:
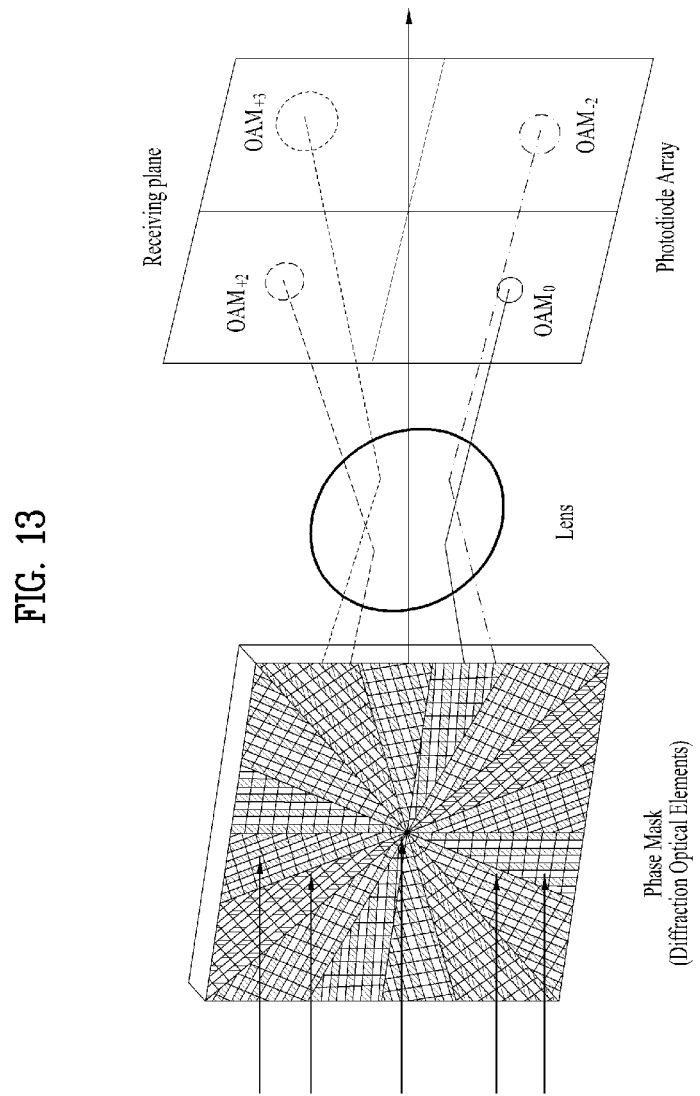
Figure 14:
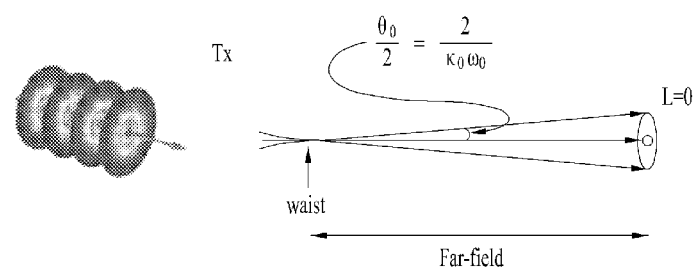
FIGS. 14 to 16 are diagrams illustrating examples of beam dispersion based on characteristics of optical resources used by the optical wireless communication system.
Figure 15:
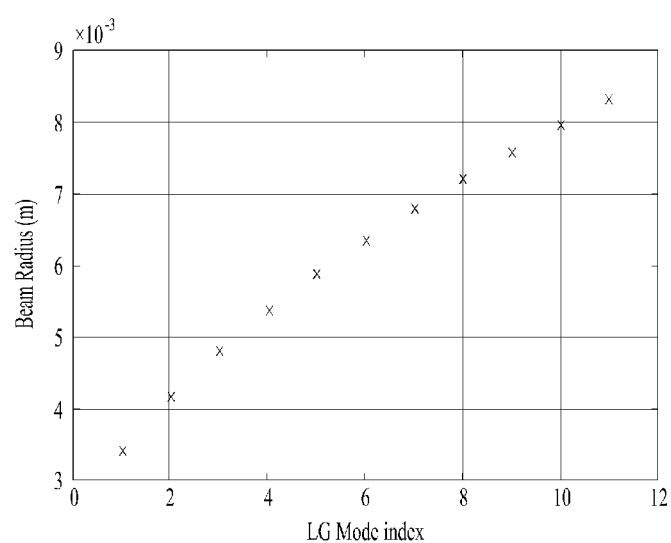
Figure 16:
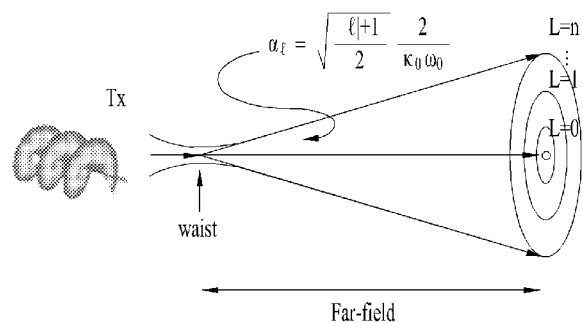

For example, it may be seen from FIG. 13 that OAM mode 0, OAM mode +2, OAM mode −2, and OAM mode +3 have different intensity distribution positions. In this case, since general plane wave light such as i) natural light such as sunlight and ii) linearly or circularly polarized light has the same phase characteristics as a plane wave of OAM mode 0, the intensity thereof may be distributed in the third quadrant of a receiving plane in which the intensity distribution of OAM mode 0 is located. On the other hand, a lens serves to focus the optical source passing through the phase mask on the receiving plane.

The receiving UE may control the position of the intensity distribution of the optical source received on the photodiode array by i) controlling the phase elements constituting the phase mask or ii) controlling the distance between the phase mask and the photodiode array, the distance between the phase mask and the lens, and/or the distance between the lens and the photodiode array.

According to an example or implementation of the present disclosure, two or more of the above-described optical filters (e.g., lens, Fresnel zone plate, photon sieve, and phase mask) may be combined and applied to obtain each characteristic multiply. For example, the receiving UE may i) receive a specific wavelength with the general optical filter to control its received wavelength, ii) receive desired polarized light with the polarization filter, and iii) distinguish plane wave and spiral wave modes based on the characteristics of wave light with the photon sieve.

3.1. Divergence Angle of Gaussian Beam

Figure 22:
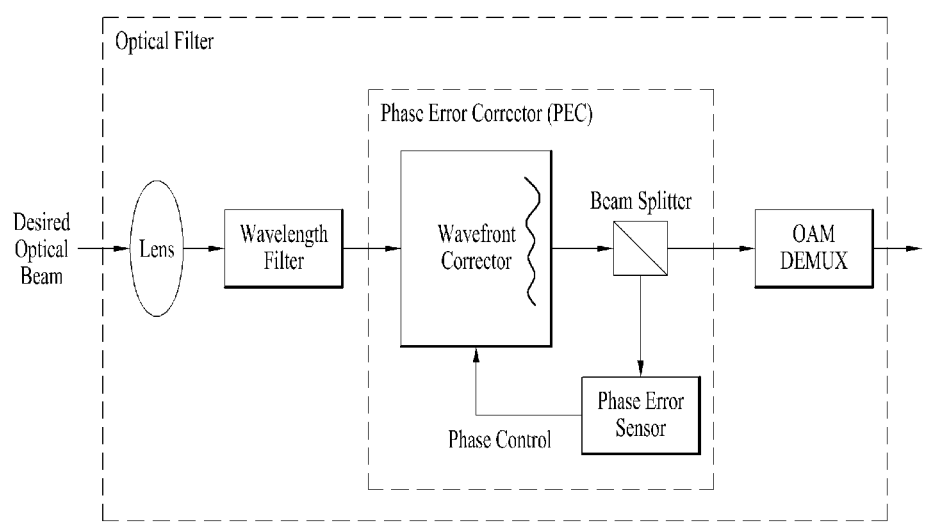

FIG. 22 is a diagram for explaining the dispersion angle of a Gaussian beam in a far field. The dispersion angle of the Gaussian beam may be defined as shown in [Equation 2] below. In Equation 2, $k_o$ is a wave vector with a value of 2pi/lambda, and $w_o$ is a minimum beam waist, which may vary depending on beam formation.

$$\frac{\theta_o}{2} = \frac{2}{k_o w_o} = \frac{\lambda}{\pi w} \quad \text{[Equation 2]}$$

It is assumed that M2 is set to 1 (M2=1) when the transmitting UE forms a beam by optimally designing an M2 factor. Referring to FIG. 22, i) when waist=658 um and wavelength=700 nm, angle=338.6 urad (i.e., 0.0194 degrees). In addition, ii) when waist=375 um and wavelength=400 nm, angle=338.6 urad (i.e., 0.0194 degree). In this case, the radius of the beam is 3.4 mm at a distance of 10 m (distance=10 m).

3.2. Divergence Angle of LG Beam

Figure 23:
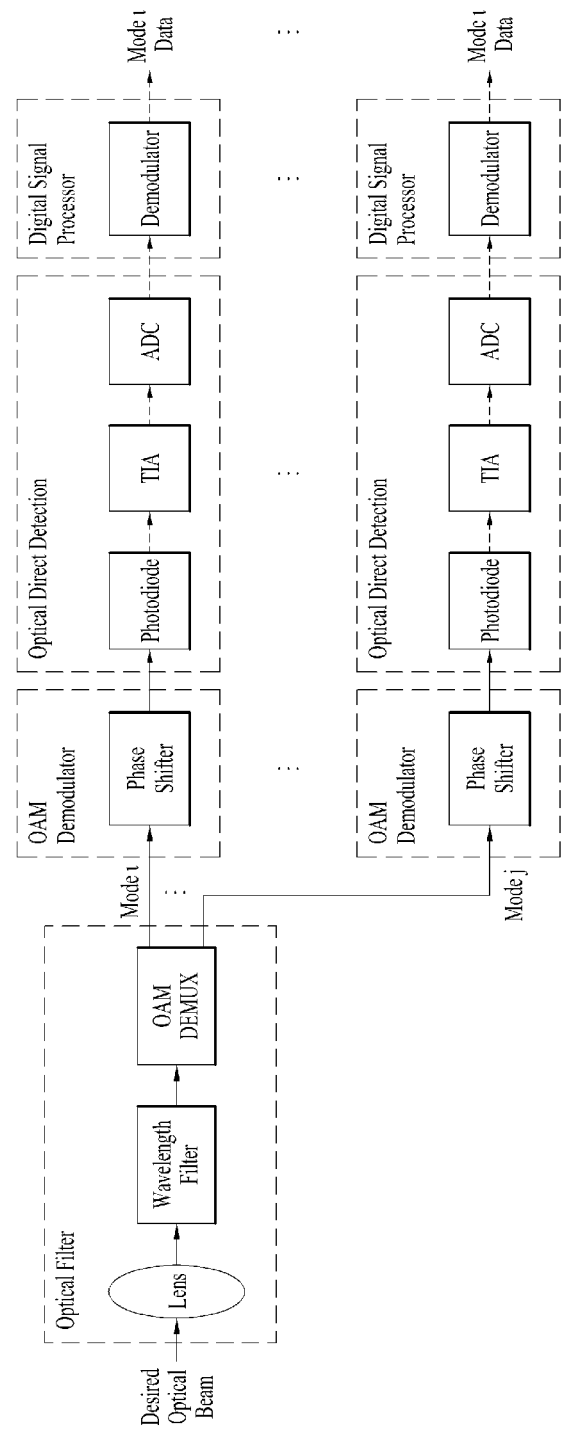
FIGS. 23 and 24 are diagrams illustrating examples of an OAM demultiplexer (DEMUX).
Figure 24:
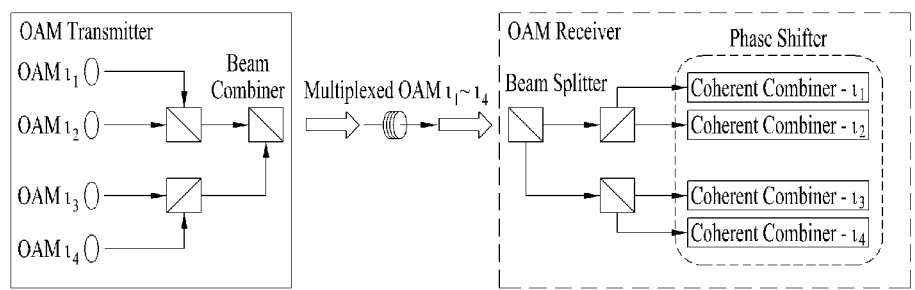

FIGS. 23 and 24 are diagrams for explaining the divergence angle of an LG beam in a far field. The divergence angle of the LG beam is defined based on [Equation 3] to [Equation 5] below. Specifically, [Equation 3] shows a case where $w_o$ is fixed, and [Equation 4] shows a case where $r_{rms}(0)$ is fixed. Here, $k_o$ is a wave vector with a value of 2pi/lambda, and $w_o$ is a minimum beam waist, which may vary depending on beam formation. The relationship between $k_o$ and $w_o$ may be defined as shown in [Equation 5]

$$\alpha_\ell = \sqrt{\frac{|\ell|+1}{2}} \frac{2}{k_o w_o} \quad \text{[Equation 2]}$$

$$\alpha_\ell = \frac{|\ell|+1}{k_o r_{rms}(0)} \quad \text{[Equation 3]}$$

$$r_{rms}(0) = \sqrt{\frac{|\ell|+1}{2}} w_o \quad \text{[Equation 4]}$$

It is assumed that M2 is set to 1 (M2=1) when the transmitting UE forms a beam by optimally designing an M2 factor. Referring to FIG. 23, the radius of the beam may appear as shown in FIG. 23 at a distance of 10 m (distance=10 m) according to |l|. Referring to FIG. 24, in the case of an OAM beam, the beam radius may vary depending on OAM orderl. Also, the beam size (e.g., beam radius) at the receiving UE may vary depending on the distance between the transmitting UE and receiving UE.

Figure 17:
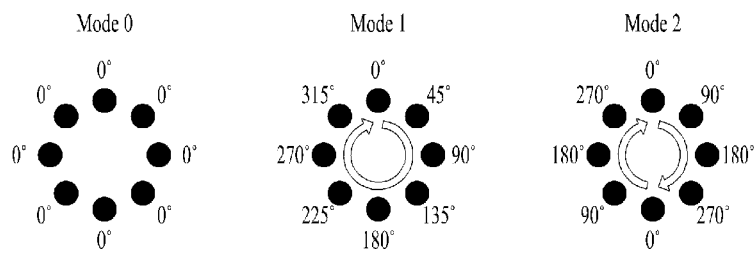
FIGS. 17 and 18 are diagrams illustrating differences in beam radius and phase characteristics according to an OAM mode of an OAM beam in the optical wireless communication system.
Figure 18:
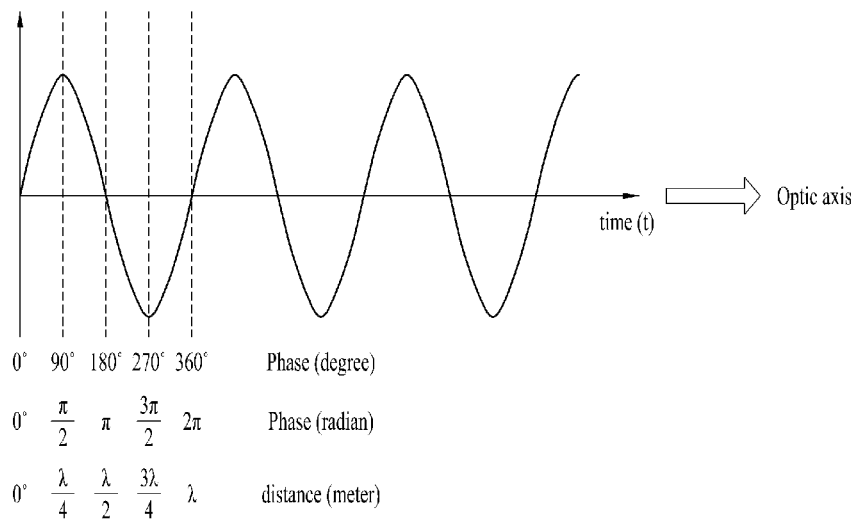

On the other hand, phase characteristics of the received wavefront may vary depending the OAM Order 1. For example, as shown in FIG. 17, a phase difference for an E-field may occur in accordance with OAM orders (or Modes). In this case, the term "phase" may indicate a change over time when viewed from the propagation direction of the light source in a situation where the E-field is represented by sine waves. Specifically, when the Y-axis of FIG. 18 indicates the vibration direction of the E-field, vibration of the E-field can be expressed as shown in FIG. 18. In FIG. 18, the graph depicting the E-field vibration over time may indicate the movement direction of light (i.e., the optical axis), and may represent the phase change over time. The change in phase may be determined by a wavelength (k) corresponding to one cycle, and the time (t) is a unit for a time during which the light travels, and the time (t=λ/c) (where c=2.99792458*10$^8$ m/s, luminous flux) during which the light travels by the distance corresponding to one cycle. Therefore, for attributes indicating that phase characteristics of the received wavefront vary depending on the OAM Order 1, the receiver must perform coherent combining while performing phase compensation. In addition, reception (Rx) decoding performance can be increased by changing the design of the receiver.

A method for efficiently receiving a signal transmitted based on an orbital angular momentum (OAM) of a photon for use in optical wireless communication according to the present disclosure will hereinafter be described. OAM using an optical direct detection system will first be described, and the other OAM using an optical coherent detection system will then be described.

Figure 19:
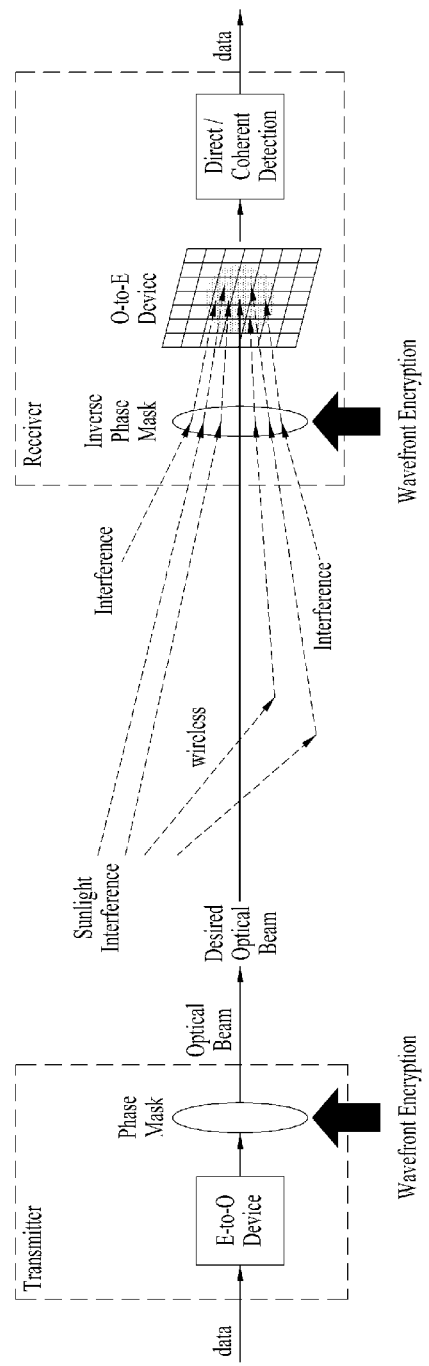
FIG. 19 is a diagram illustrating an optical wireless communication system including a receiving UE.

In the system shown in FIG. 19, the transmitter may transmit a desired OAM beam to the receiver using a photon OAM beam generator. The receiver may decode data through the optical filter, the O-to-E device, and the detect detection method. On the other hand, the overall block diagram of the optical direction detection receiver can be expressed as shown in FIG. 20.

Figure 20:
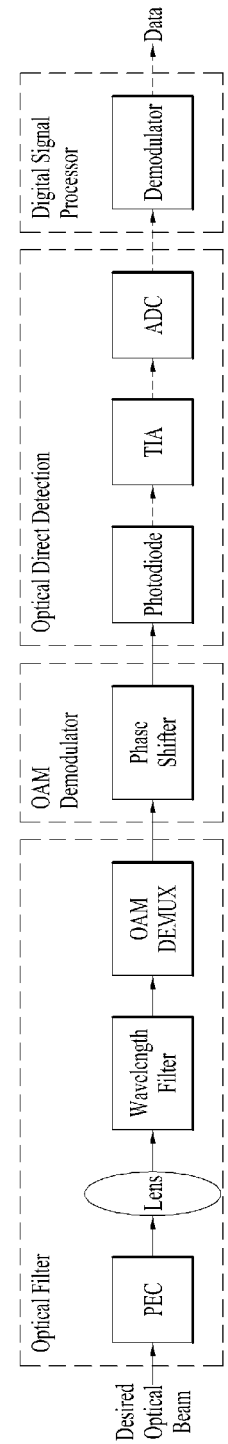
FIG. 20 is a diagram illustrating a detailed structure of the receiving UE.

Referring to FIG. 20, a solid arrow may indicate a state of an optical signal, and a dotted arrow may indicate a state of an electrical signal. The receiver may include: i) an optical filter for directly receiving a desired optical beam; ii) an OAM modulator for converting the received OAM beam into a Gaussian beam; iii) an optical direct detection unit for converting the Gaussian beam into an electrical digital signal; and iv) a digital signal processor for decoding a signal based on the electrical digital signal.

1.1. Optical Filter 1.1.1 Phase Error Correction

Figure 21:
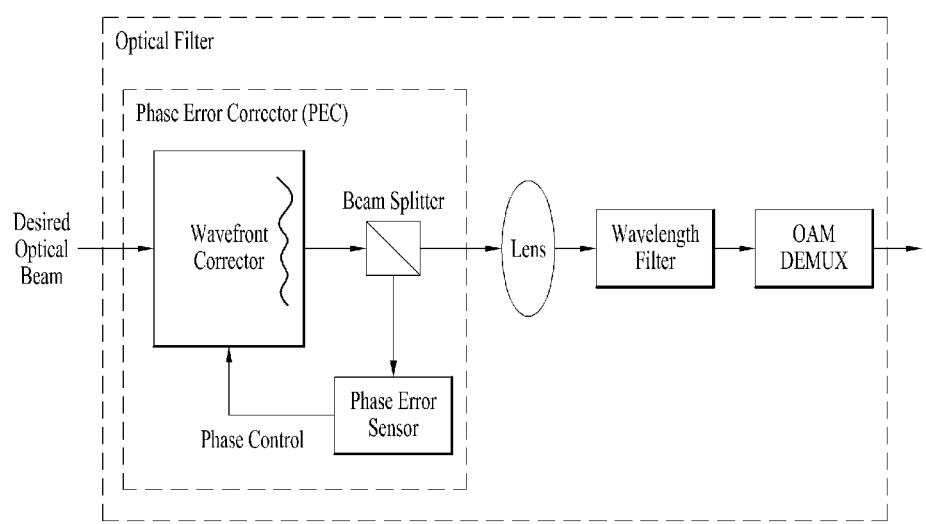
FIGS. 21 and 22 are diagrams illustrating examples of a phase error corrector (PEC).

Phase error correction may refer to an operation in which compensation for a change in wavefront is performed in the receiver. In a wireless channel, there may be a change in phase characteristics by the influence of diffraction, reflection, and/or refraction of photons in the air. Since the OAM orders of the OAM-based desired signals are classified according to the phase characteristics in the wavefronts, the change in phase characteristics can reduce the OAM mode classification and decoding performance of the receiver. In order to address this issue, the receiver may include a phase error corrector (PEC) for performing phase error correction. In the receiver, the PEC may be provided before focusing through the lens, as shown in FIG. 21. When the PEC is provided in the receiver, the sensing area is large and there are so many micro-mirrors constituting the wavefront corrector that the phase error existing in the wavefront can be precisely controlled. However, the size and cost of the receiver may be increased.

According to another example of the present disclosure, the PEC may also be provided after focusing through the lens, as shown in FIG. 22. In this case, since the wavefront of the desired beam is reduced through lens focusing, the sensing area for the PEC is small and there are a small number of micro-mirrors constituting the wavefront corrector. As a result, it is impossible to precisely control the phase error existing in the wavefront, but the size and cost of the receiver can be reduced. Hereinafter, the PEC may be considered selective unless otherwise mentioned.

1.1.2. Lens

The lens may focus the received optical beam.

1.1.3. Wavelength Filter

The wavelength filter may pass only a wavelength corresponding to a desired optical beam.

1.1.4. OAM DEMUX

The OAM DEMUX is an optical device that distinguishes a desired OAM beam. The optical device that can be used as the OAM DEMUX may include, for example, a convex lens, a phase pattern mask, a photon sieve, a Fresnel zone plate, etc. When the desired OAM beam is multiplexed and transmitted, the path can be subdivided in a manner that the OAM beam can be decoded after passing through a different OAM demodulator for each OAM mode. For example, as shown in FIG. 23, the beams can be separately decoded with different OAM demodulator chains for the respective modes (Mode 1 to Mode j).

On the other hand, the OAM DEMUX can only perform a beam split function. That is, the OAM DEMUX may only beam split the received beam, and may perform coherent combining through phase compensation corresponding to each mode in the OAM modulator, so that data decoding for each mode can be performed. For example, as shown in FIG. 24, after branching the received beam through a beam splitter, the beam can be converted into a Gaussian beam through reverse compensation of a phase corresponding to each OAM mode 1. In this case, the beam splitter may correspond to the OAM DEMUX, and the coherent combiner corresponding to each mode may correspond to the OAM demultiplexer unit as a phase shifter.

1.2. OAM Demodulator

Figure 25:
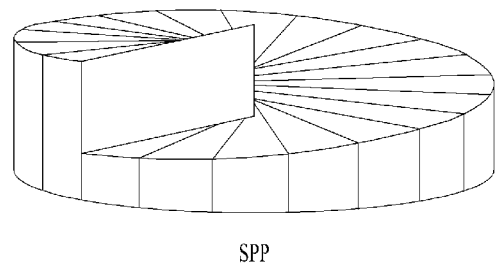
FIGS. 25 to 30 are diagrams illustrating examples of an OAM demodulator.
Figure 26:
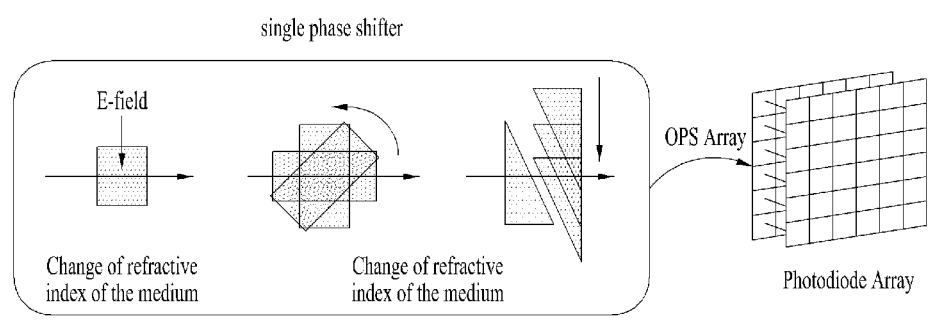
Figure 27:
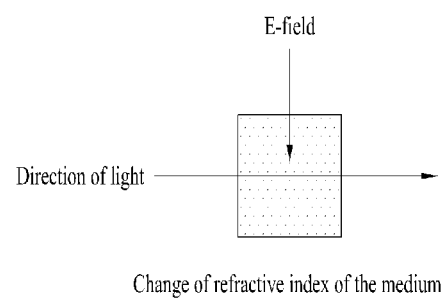

The OAM demodulator may be a phase shifter for converting a photon OAM Beam (TEMpl) received in Mode 1 into a Gaussian beam. The phase shifter may be, for example, a spiral phase plate (SPP) that can simultaneously convert the entire received beam area as shown in FIG. 25. Alternatively, for the entire beam area as shown in FIG. 26, the phase shifter may be a device that can constitute the optical phase shifter (OPS) array (hereinafter referred to as "OPS array") based on a plurality of phase shifters.

Figure 28:
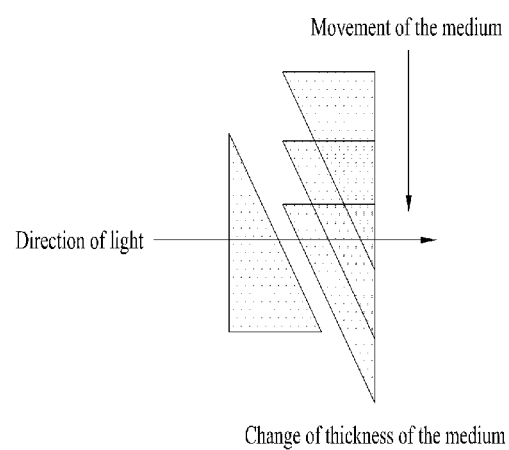
Figure 29:
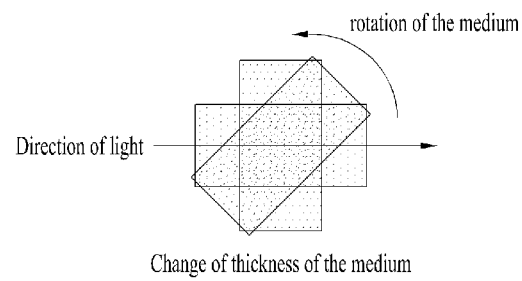
Figure 30:
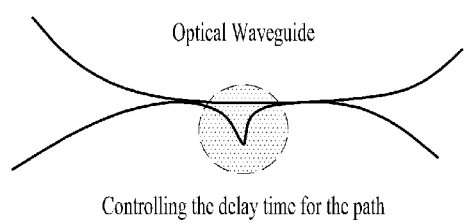

FIGS. 27 to 30 are diagrams illustrating that optical elements for configuring the OPS array constitute a phase shifter for some positions of the entire received beam area. The optical element shown in FIG. 27 may use a change in refractive index of a medium by applying the E-field to the medium based on an electro-optical effect. The optical element shown in FIG. 28 is a device that changes a thickness of the medium through which light passes by moving the medium based on a Babinet-Soleil compensator. The optical element shown in FIG. 29 is a device that changes the thickness of the medium through which light passes by rotating the medium. The optical element shown in FIG. 30 is a device for controlling a delay time for a path through which light travels on the basis of an optical waveguide.

1.3. Optical Direct Detection

1.3.1. Photodiode

The photodiode may generate a photocurrent by emitting light when an external circuit is connected to a photovoltaic effect-type diode. The photodiode may convert the optical signal into an electrical signal as described above. A photodiode configured to use the photovoltaic effect of the Schottky diode of the metal-semiconductor contact instead of the p-n junction can also be used. In addition, the P-I-N photodiode formed by inserting the layer (i) between the layer (p) and the layer (n) can be used. An avalanche photodiode (APD) may be used by applying a reverse bias of about 105 V/cm to the P-N junction, thereby realizing high sensitivity using electron avalanche multiplication of carriers.

1.3.2. Transimpedance Amplifier (TIA)

TIA is a device for converting a received current into a voltage.

1.3.3. Analog-to-Digital Converter (ADC)

ADC is a device for converting an analog signal into a digital signal.

1.4. Digital Signal Processor

A demodulator is a device that demodulates a signal modulated at a transmitter by a reverse process or a promised method.

1.5. OPS Array 1.5.1. The phase shifter used as the OAM demodulator is a device used for mode conversion into a Gaussian mode through phase reverse compensation for each OAM mode, and may have the following structure according to the relationship between the optical phase shifter (OPS) and the photodiode for OAM direct detection.

1.5.2. 1:1 Relationship 1.5.2.1. Single OPS and Single Photodiode

Figure 31:
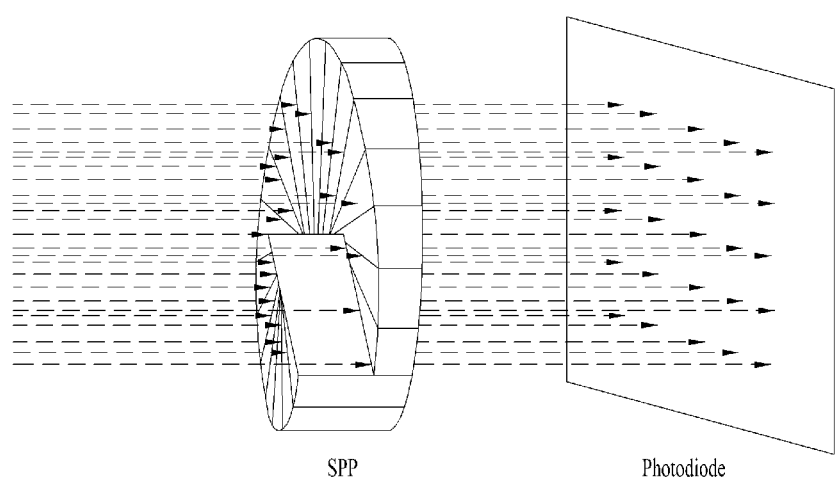
FIGS. 31 to 37 illustrate various examples of the receiving UE according to the relationship of a correspondence between a phase shifter and a photodiode.

According to the present disclosure, a single phase shifter and a single photodiode can be used for conversion for each mode. Referring to FIG. 31, a spiral phase plate (SPP) may be provided as a single OPS, and a single photodiode may be provided. In this case, the received desired OAM beam is converted into a Gaussian beam through the SPP, and the total received optical signal of the Gaussian beam can be converted into an electrical signal by a single photodiode.

1.5.2.2. OPS Array and Photodiode Array

Figure 32:
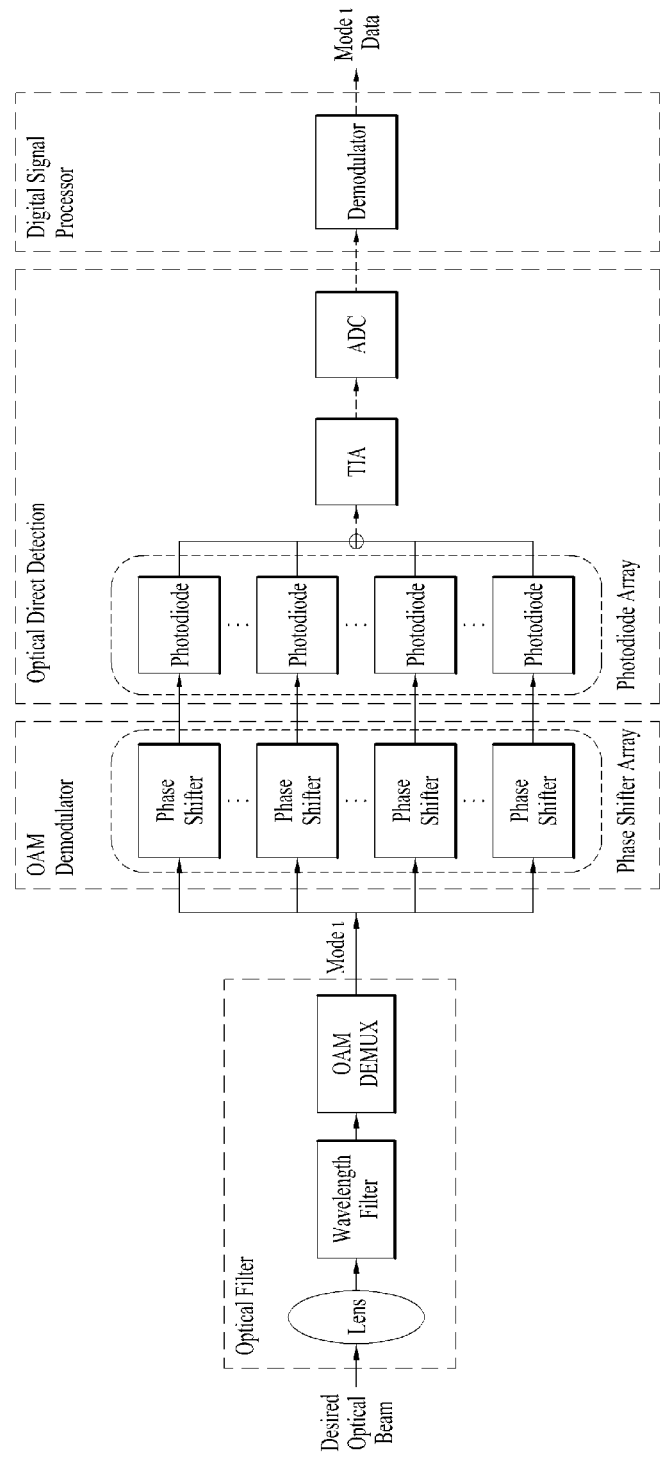
Figure 33:
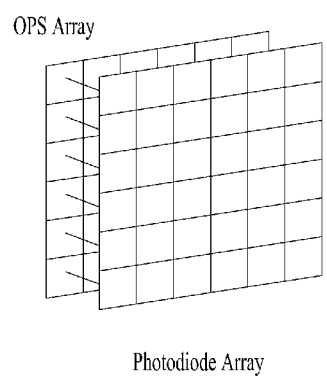

Referring to FIG. 32, the OPS array and the photodiode array may be used for conversion for each mode. In this case, the OPS array and the photodiode array may have a 1:1 relationship. In FIG. 32, considering a single optical direct detection chain, all of the electrical signals converted by the respective photodiodes are summed and converted into a voltage format through the TIA. For example, as shown in FIG. 33, at least one phase shifter may be included in the OPS array, and a photodiode array may be provided. Accordingly, the received desired OAM beam is converted into a plane wave form of the Gaussian beam through phase conversion for the corresponding region in each phase shifter, and the total received optical signal of the Gaussian beam can be converted into an electrical signal in each photodiode for the corresponding region.

1.5.3. 1:M Relationship

Figure 34:
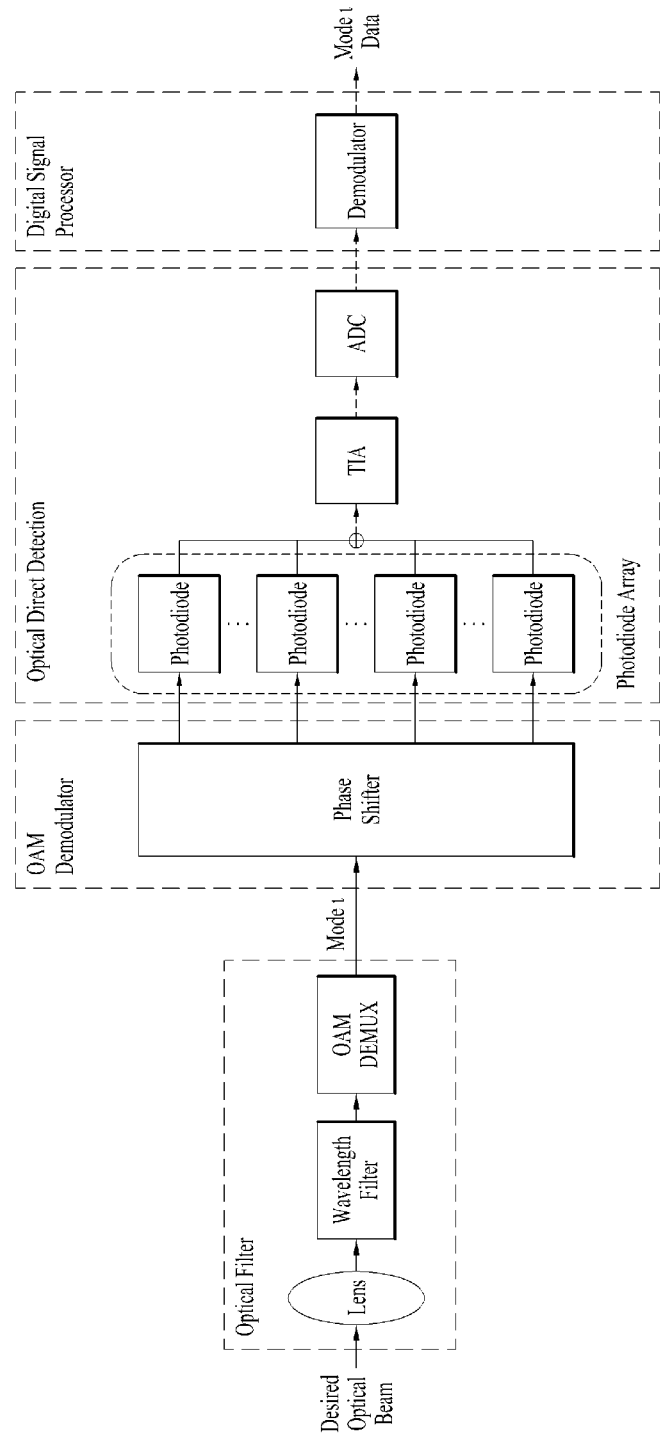
Figure 35:
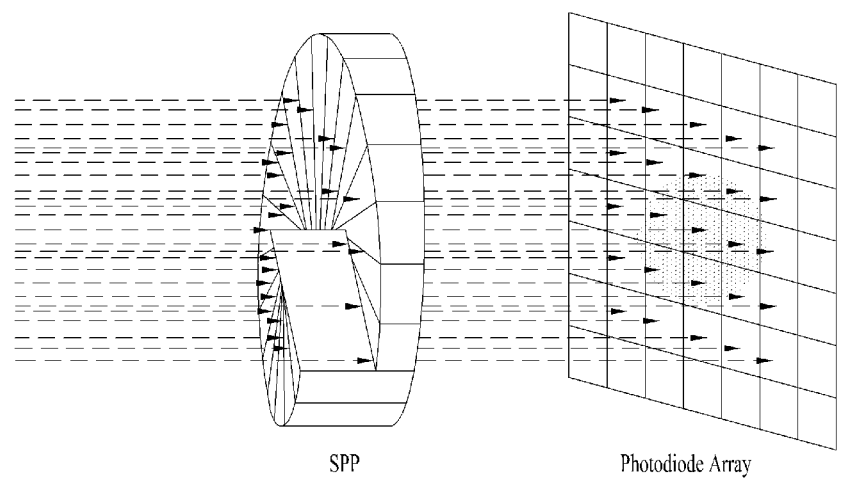

A single OPS and a photodiode array may be used for conversion for each mode as shown in FIG. 34. In this case, the single OPS and the photodiode array may have a 1:M relationship. In FIG. 34, considering a single optical direct detection chain, all of the electrical signals converted by the respective photodiodes are summed and converted into a voltage format through the TIA. For example, as shown in FIG. 35, a phase shifter may be provided as a spiral phase plate (SPP) and a photodiode array may be provided. Accordingly, the received desired OAM beam is converted into a plane wave form of the Gaussian beam through phase conversion for the entire area in the SPP, and the total received optical signal of the Gaussian beam can be converted into an electrical signal.

1.5.4. N:1 Relationship

Figure 36:
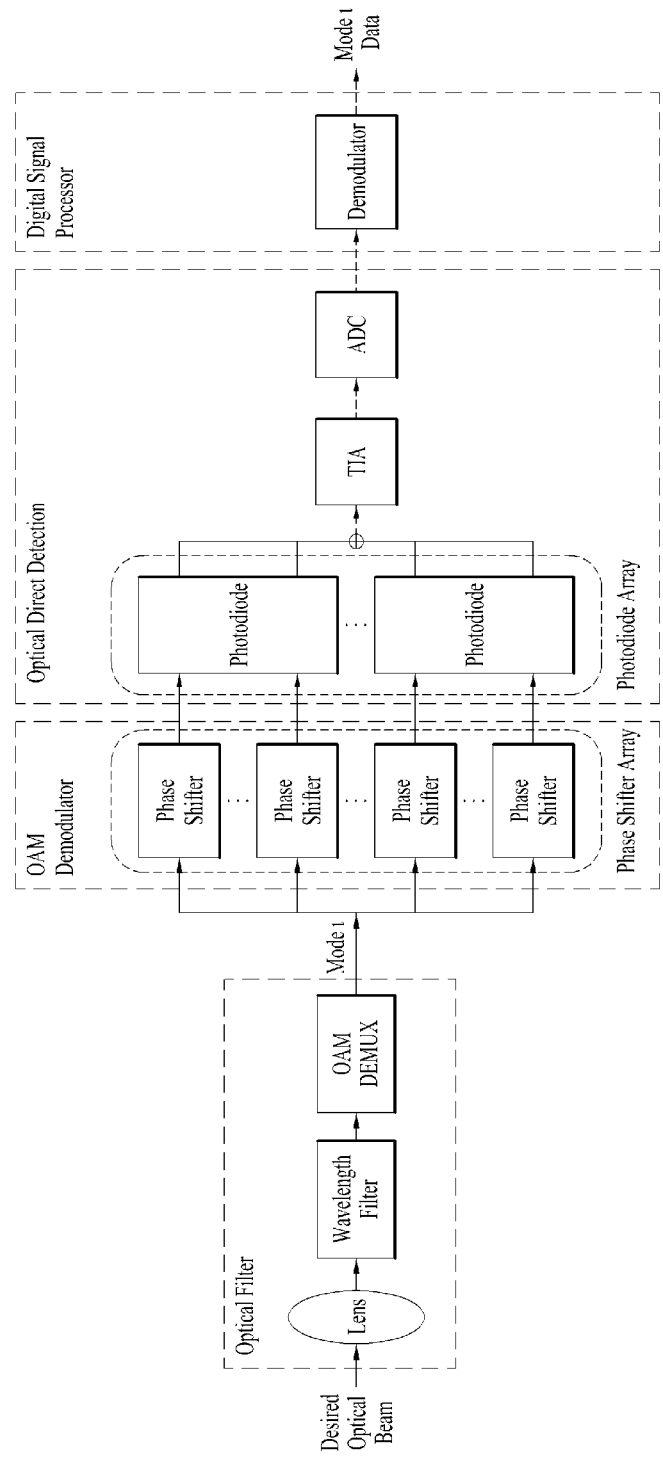
Figure 37:
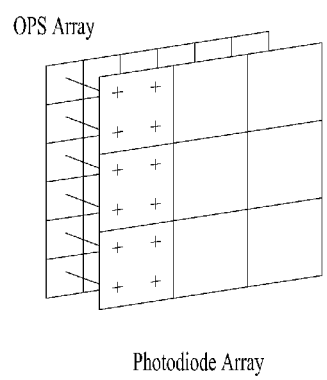

Referring to FIG. 36, for conversion for each mode, the OPS array and the single photodiode may be used or a photodiode array may be used. In this case, the OPS array and the photodiode array may have a N:1 relationship. In FIG. 36, considering a single optical direct detection chain, all of the electrical signals converted in each photodiode are summed and converted into a voltage format through the TIA. For example, as shown in FIG. 37, at least one phase shifter may be included in the OPS array, and a photodiode array may be provided. Accordingly, the received desired OAM beam is converted into a plane wave form of the Gaussian beam through phase conversion for the corresponding region in each phase shifter, and the total received optical signal of the Gaussian beam can be converted into an electrical signal in each photodiode for the corresponding region.

The relationship between the OPS used as the OAM demodulator and the photodiode for the OAM direct detection may have the following implementation characteristics (i), (ii), (iii), (iv), (v), (vi), and (vii). In more detail, i) as the number of OPSs increases, the implementation cost and size can be increased, ii) as the number of OPSs increases, the reception (Rx) performance can be increased when phase compensation is performed through control of each OPS, iii) as the number of OPSs increases, phase compensation can be performed without alignment of Tx-Rx devices when phase compensation is performed through control of each OPS, iv) as the number of phototiodes increases, the implementation cost and size of each photodiode can be increased, and v) from the viewpoint of the total O-to-E conversion, as the number of photodiodes increases, it is impossible to enlarge the reception range in which signals or beams can be received through O-to-E conversion in each photodiode. For example, when a single range is set to 1-10, 10 photodiodes can receive signals or beams within the range of 10-100. In addition, vi) as the number of photodiodes increases, the performance requirements of each photodiode can be reduced, and vii) the optimal design can be performed through various combinations of the OPS array and the photodiode array.

1.6. Optical Direct Detection Chain 1.6.1. Single Optical Direct Detection Chain As described above with reference to FIG. 32, the electrical signals converted in the respective photodiodes through a single optical direct detection chain are summed and converted into a voltage format through the TIA.

1.6.2. Multiple Optical Direct Detection Chain

Figure 38:
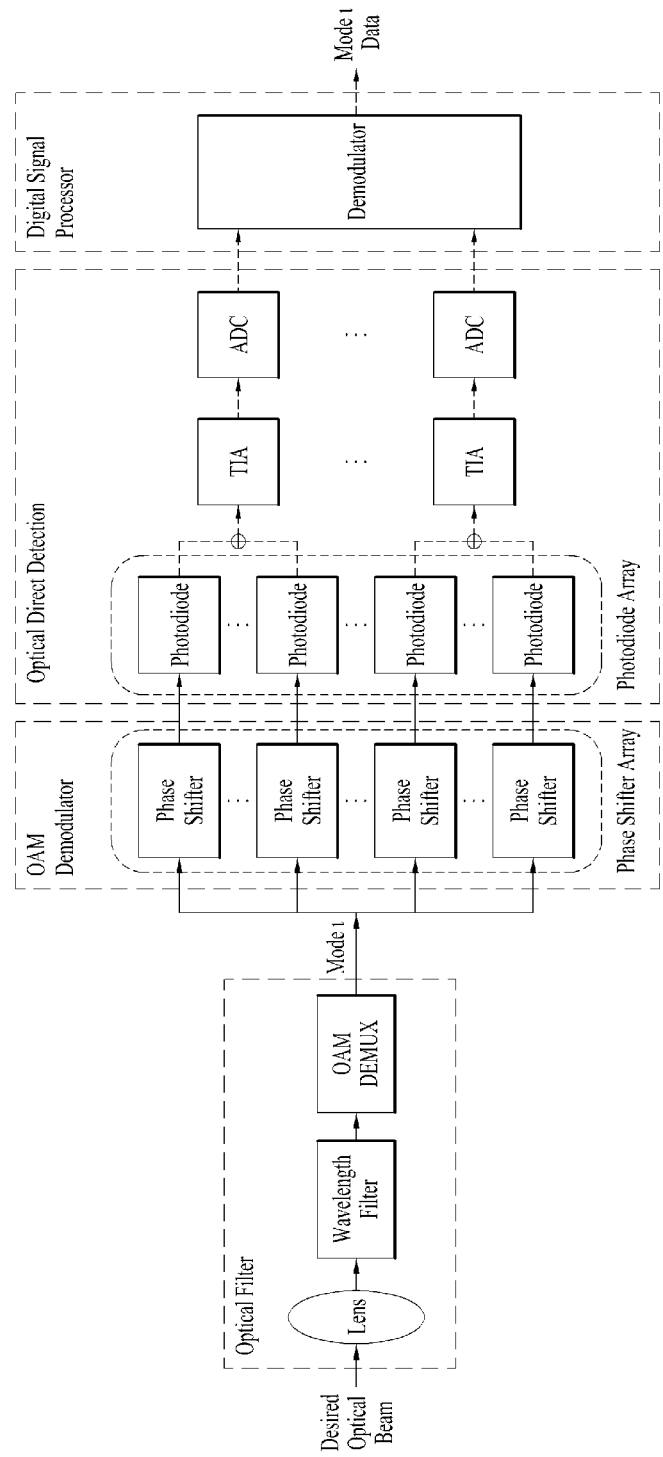
FIG. 38 is a conceptual diagram illustrating multiple optical direct detection.

As shown in FIG. 38, the electrical signals converted in the respective photodiodes are grouped and added, and the resultant signals can be converted into a voltage format through the TIA. The photodiodes and the TIAs may have the relationship of N:1, so that the electrical signal can be converted into a digital signal for each chain. In this case, the diversity effect can be expected when decoding in a digital signal processor is performed based on each converted digital signal.

1.6.3. Full Optical Direct Detection Chain

Figure 39:
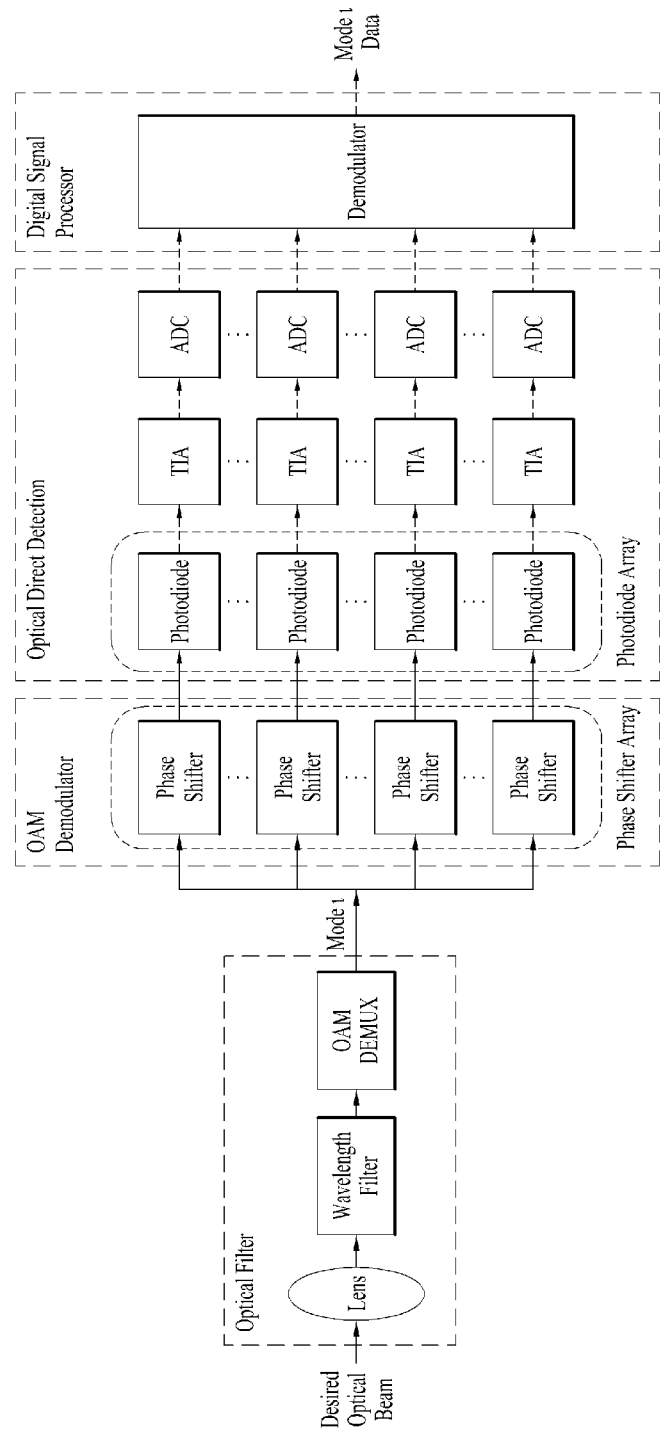
FIG. 39 is a conceptual diagram illustrating a full optical direct detection chain.

As shown in FIG. 39, the electrical signals converted in the respective photodiodes can be converted into voltages through the respective TIAs. In this case, the photodiodes and the TIAs may have the relationship of 1:1, and an electrical signal may be converted into a digital signal for each chain. In this case, the diversity effect can be maximized when decoding in the digital signal processor is performed based on each of the converted digital signals. However, the energy efficiency and cost efficiency may be reduced.

1.7 Analog-to-Digital Converter (ADC)

Figure 40:
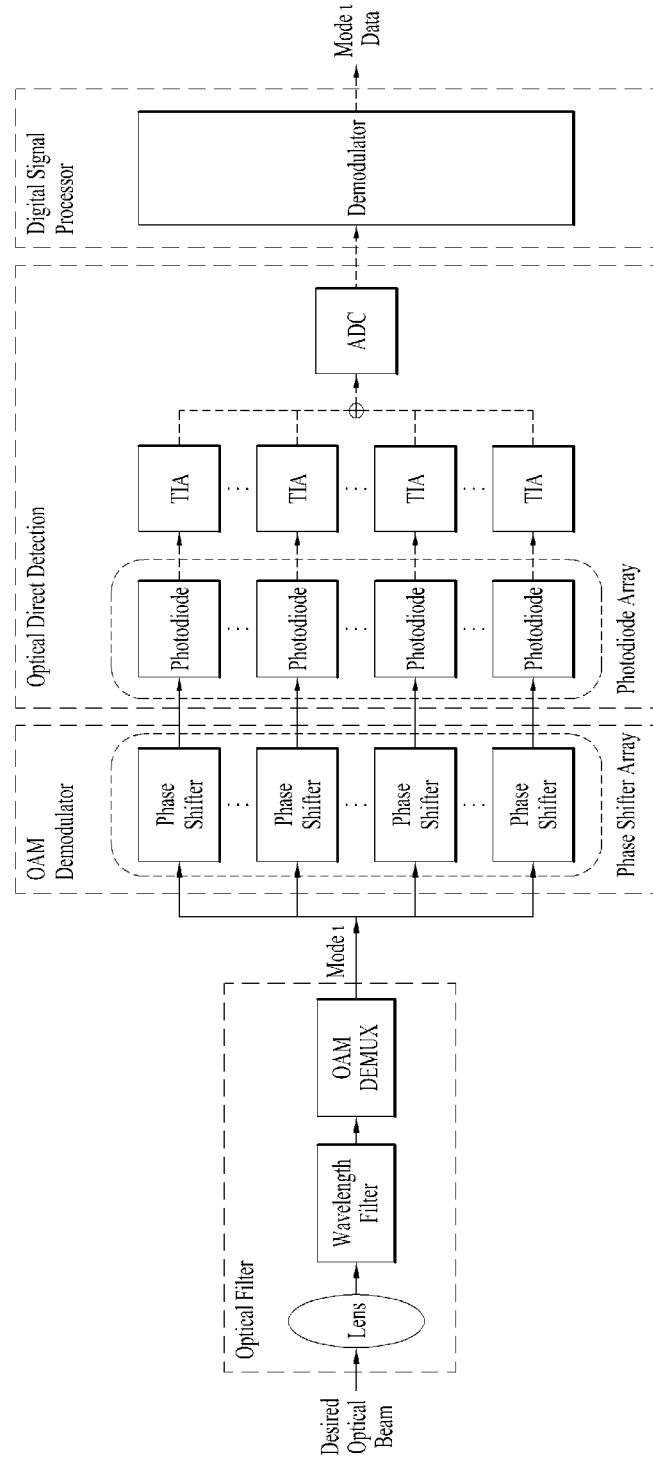
FIG. 40 is a diagram illustrating an analog-to-digital converter (ADC).

As shown in FIG. 40, the electrical signals converted in the respective photodiodes can be converted into voltages through the respective TIAs, and the converted voltage is added to digitize the electrical signal. In this case, signal decoding is performed in the digital signal processor based on the single digitized signal. Here, the diversity effect can be degraded, but the decoded result has advantages in terms of energy efficiency and cost. That is, the TIA chains and the ADCs may have the relationship of N:1.

1.8 Average Interference Tracking (AIT)

Figure 41:
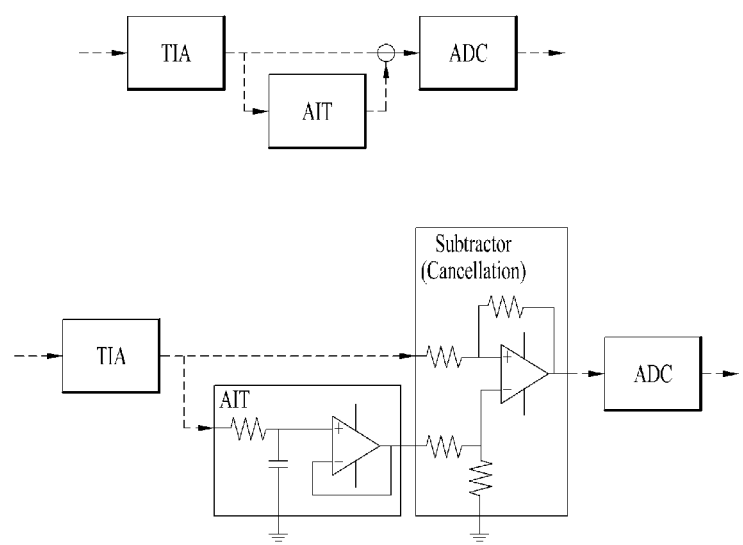
FIGS. 41 to 44 are diagrams illustrating examples of average interference tracking (AIT).

AIT may be provided at a receiver, which can perform interference tracking by measuring constant interference. The AIT may be provided between the TIA and the ADC. Referring to FIG. 41, the AIT may measure interference at the output voltage of the TIA and remove the corresponding interference before reaching the ADC.

Figure 42:
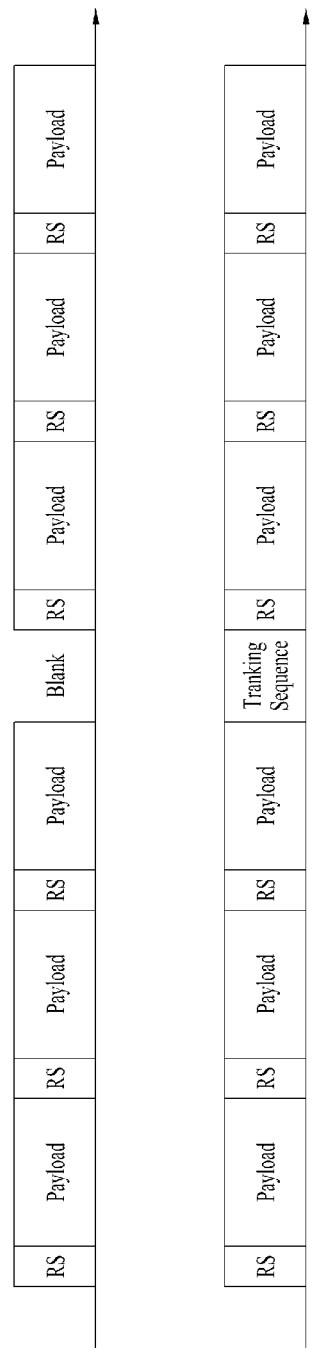

On the other hand, the AIT may operate periodically to measure interference. Referring to FIG. 42, an interference measurement reference (IMR) signal can be defined between the transmitter and the receiver for accurate interference measurement of the AIT. The IMR may be formed in a blank signal or a predefined sequence. The IMR may be transmitted at a predetermined period or at a predetermined resource position according to engagement between the transmitter and the receiver. The period of the IMR may be established to be shorter than the period of change in interference. For example, in the period of the IMR, a training sequence and/or a blank sequence may be used with a shorter period than a change in the amount of sunlight due to the atmosphere (e.g., clouds) or reflection of an object, so that sunlight interference can be measured.

Figure 43:
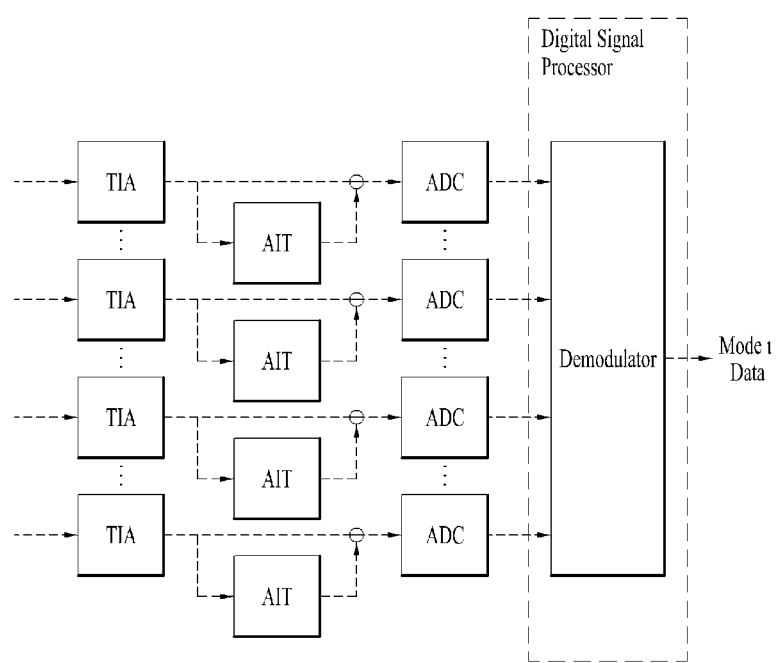
Figure 44:
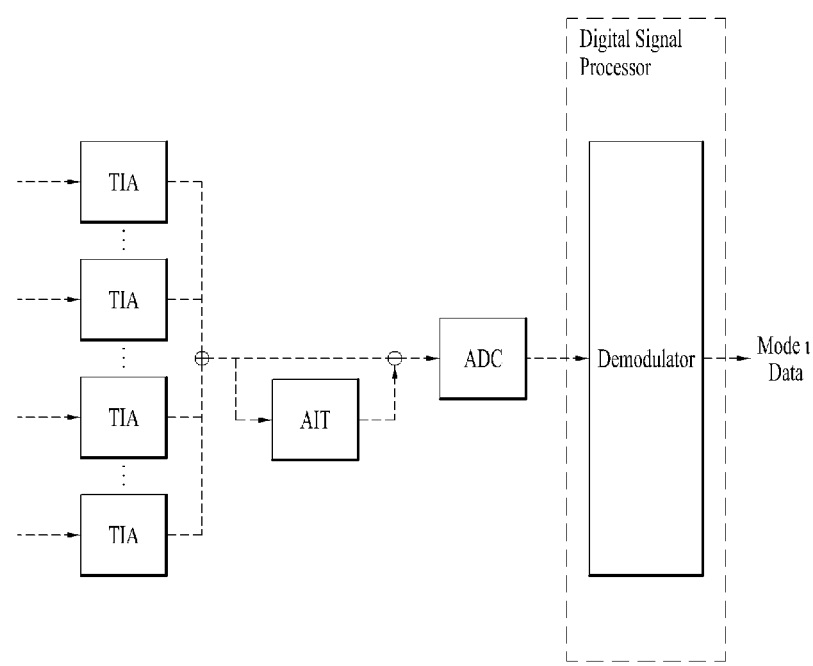

On the other hand, the TIAs and the AITs may have the relationship of 1:1. For example, as shown in FIG. 43, individual interference may be measured for the output voltage of each TIA, and the measured interference may be removed, thereby increasing interference cancellation performance. In this case, design cost and energy efficiency may be degraded. Alternatively, the TIAs and the AITs may have the relationship of N:1. For example, as shown in FIG. 44, all of the output voltages of the TIA are summed to measure total interference, and the measured interference is removed, so that the design cost and the energy efficiency can be increased. In contrast, interference cancellation performance may be degraded.

In the description of sections 1.1 to 1.8 above, it is obvious to those skilled in the art that combinations not mentioned for each case can be easily used. For example, the relationship between the OPS array and the photodiode array, the relationship between the photodiode array and the TIA chain, the relationship between the TIA chain and the AIT, and the relationship between the TIA and the ADC may be formed independently. Accordingly, according to the efficiency of implementation, the relationship of the respective constituent components can be established.

Hereinafter, OAM using an optical coherent detection system will be described. The above-described optical direct detection system may correspond to a method of measuring optical power or demodulating data based on the amplitude of a signal through a photon counting process. Therefore, performance can be limited by being affected by electronic noise of the receiver. In contrast, according to optical coherent detection, since all of the amplitude, frequency and phase of the optical signal are measured, there are many technologies that can cope with electronic noise, and the efficiency of the receiver can be improved.

Figure 45:
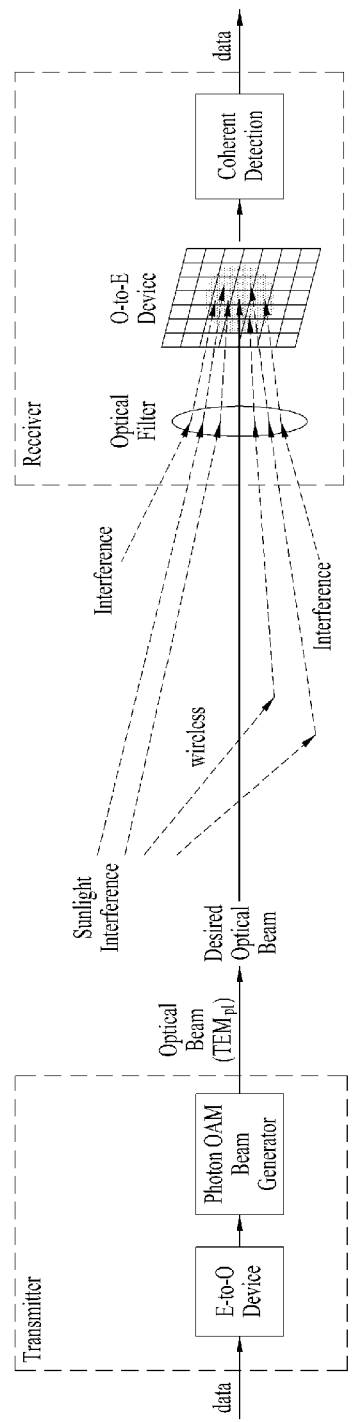
FIG. 45 is a diagram illustrating an optical coherent detection system including a receiver and a transmitter which are based on coherent detection.

FIG. 45 illustrates an optical coherent detection system including a receiver and a transmitter based on coherent detection. In the transmitter, a desired optical beam is transmitted to the receiver through a photon OAM beam generator. In the receiver, data can be decoded through the optical filter, the O-to-E device, and a coherent detection algorithm.

Figure 46:
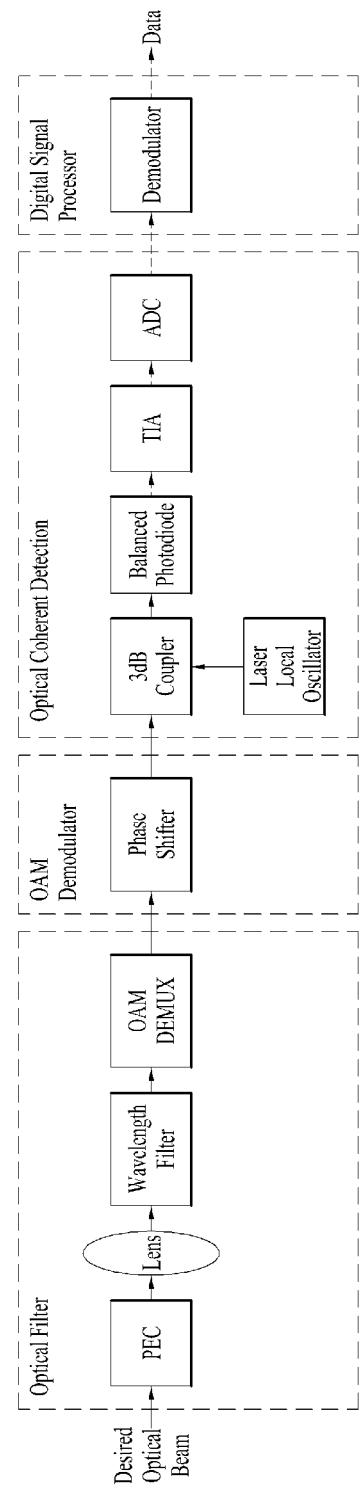
FIG. 46 is a block diagram illustrating constituent elements of an optical coherent detection receiver.
Figure 47:
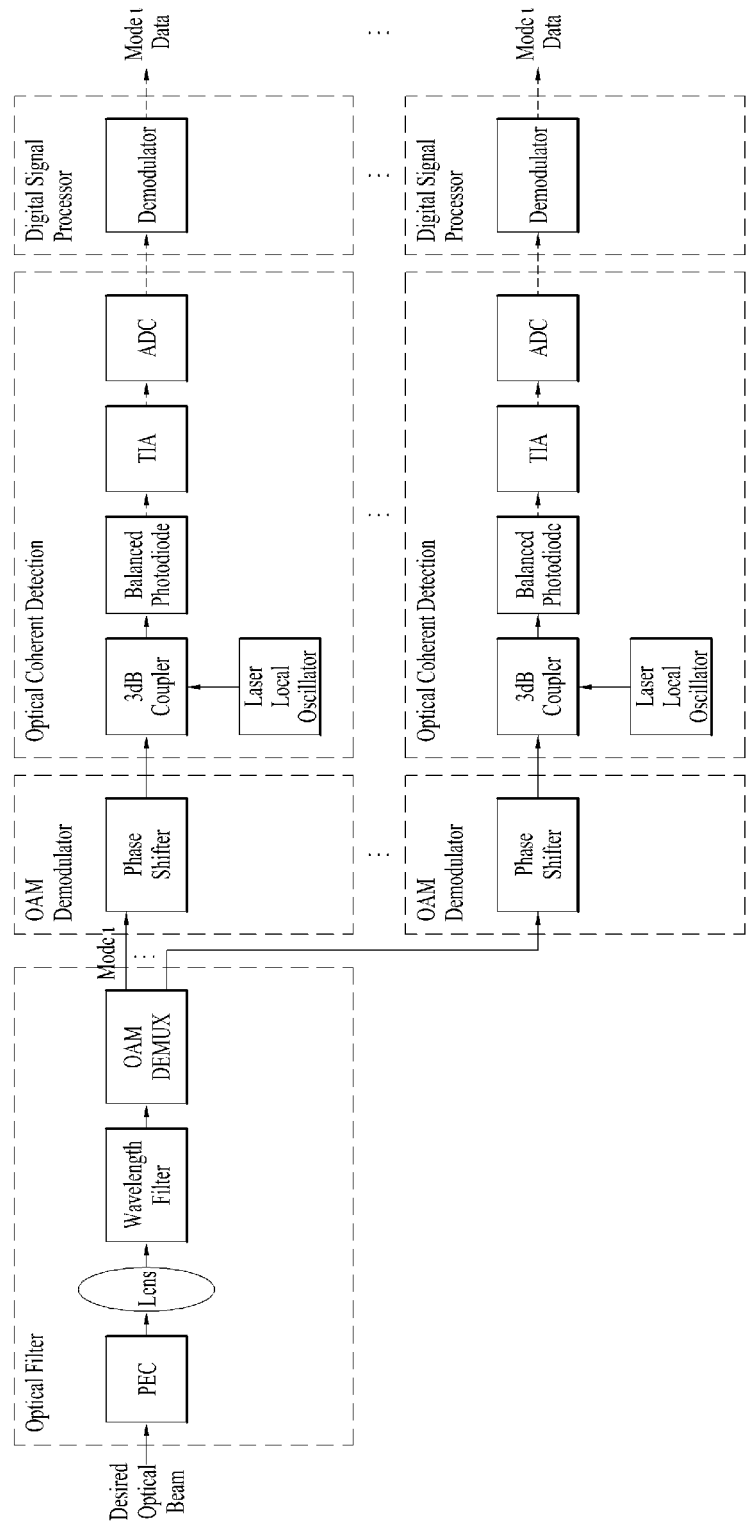
FIG. 47 is a block diagram illustrating an OAM DEMUX of the optical coherent receiver.

FIG. 46 is a block diagram illustrating the optical coherent detection receiver. In FIG. 46, the solid arrow indicates the state of the optical signal, and the dashed arrow indicates the state of the electrical signal. The receiver may include an optical filter for directly receiving a desired optical beam, an OAM demodulator for converting the received OAM beam into a Gaussian beam, an optical coherent detection unit for converting the Gaussian beam into an electrical digital signal, and a digital signal processor unit for decoding a signal based on the electrical digital signal.

2.1. Optical Filter 2.1.1 Phase Error Correction

PEC may indicate that, in the receiver, compensation on a change in wavefronts is performed. As can be seen from the receiver shown in FIG. 21, a phase error corrector (PEC) designed to perform phase error correction may be provided before focusing through the lens. When the PEC is provided in the receiver, the sensing area is large and there are so many micro-mirrors constituting the wavefront corrector that the phase error existing in the wavefront can be precisely controlled. However, the size and cost of the receiver may be increased.

Alternatively, the PEC may also be provided after focusing through the lens as described above in FIG. 22. In this case, since the wavefront of the desired beam is reduced through lens focusing, the sensing area for the PEC is small and there are a small number of micro-mirrors constituting the wavefront corrector. As a result, it is impossible to precisely control the phase error existing in the wavefront, but the size and cost of the receiver can be reduced.

2.1.2. Lens

The lens may focus the received optical beam.

2.1.3. Wavelength filter

The wavelength filter may pass only a wavelength corresponding to a desired optical beam.

2.1.4. OAM DEMUX

The OAM DEMUX is an optical device that distinguishes a desired OAM beam.

The optical device that can be used as the OAM DEMUX may include, for example, a convex lens, a phase pattern mask, a photon sieve, a Fresnel zone plate, etc. When the desired OAM beam is multiplexed and transmitted, the path can be subdivided in a manner that the OAM beams can be decoded after passing through different OAM demodulators for the respective OAM modes. For example, as shown in FIG. 23, the beams can be individually decoded with different OAM demodulator chains for the respective modes (Mode 1 to Mode j).

On the other hand, the OAM DEMUX can only perform a beam split function. That is, the OAM DEMUX may only beam split the received beam, and may perform coherent combining through phase compensation corresponding to each mode in the OAM modulator, so that data decoding for each mode can be performed. For example, as shown in FIG. 24, after branching the received beam through a beam splitter, the beam can be converted into a Gaussian beam through reverse compensation of a phase corresponding to each OAM mode 1. In this case, the beam splitter may correspond to the OAM DEMUX, and the coherent combiner corresponding to each mode may correspond to the OAM demodulator unit as a phase shifter.

2.2. OAM Demodulator

The OAM demodulator may be a phase shifter for converting a photon OAM Beam (TEMpl) received in Mode 1 into a Gaussian beam. The phase shifter may be, for example, a spiral phase plate (SPP) that can simultaneously convert the entire received beam area as shown in FIG. 25. Alternatively, for the entire beam area as shown in FIG. 26, the phase shifter may be a device that can constitute the optical phase shifter (OPS) array (hereinafter referred to as "OPS array") based on a plurality of phase shifters.

FIGS. 27 to 30 are diagrams illustrating that optical elements for configuring the OPS array constitute a phase shifter for some positions of the entire received beam area. The optical element shown in FIG. 27 may use a change in refractive index of a medium by applying the E-field to the medium based on an electro-optical effect. The optical element shown in FIG. 28 is a device that changes a thickness of the medium through which light passes by moving the medium based on a Babinet-Soleil compensator. The optical element shown in FIG. 29 is a device that changes the thickness of the medium through which light passes by rotating the medium. The optical element shown in FIG. 30 is a device for controlling a delay time for a path through which light travels on the basis of an optical waveguide.

2.3. Optical Coherent Detection 2.3.1. Laser Local Oscillator (LO)

A laser local oscillator (LO) may serve as a narrow-linewidth tunable laser, and may be a device that generates an optical source having a center frequency that is the same as or similar to the Rx desired optical beam.

2.3.2. 3 dB Coupler

Figure 48:
FIGS. 48 to 50 are diagrams illustrating a laser oscillator, a coupler, and a balanced photodiode of the optical coherent receiver.

Referring to FIG. 48, the 3 dB coupler is a device that receives and mixes two optical sources, and splits the optical sources again at a ratio of 50:50. As shown in FIG. 48, a phase difference between output sources can be variously configured according to the design of the 3 dB coupler.

2.3.3. Balanced Photodiode

Figure 49:
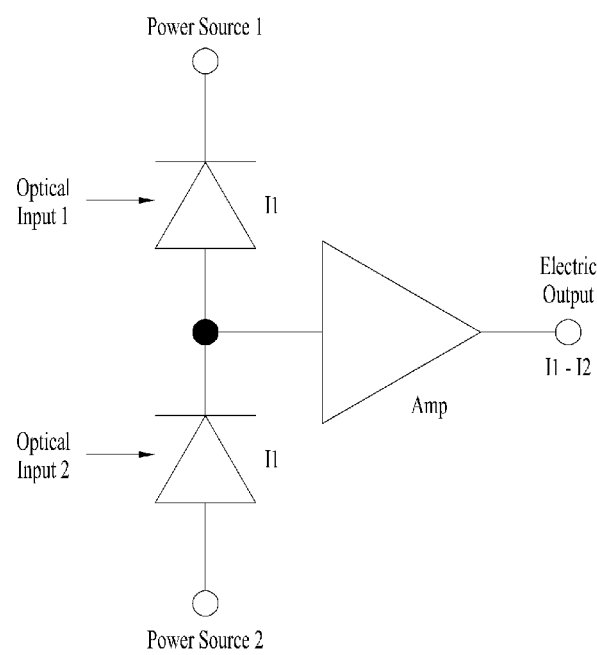

FIG. 49 is a diagram illustrating a Balanced Photodiode. Referring to FIG. 49, a balanced photodiode is a device that outputs only a current corresponding to a difference in current between the optical signals received from two photodiodes.

Figure 50:
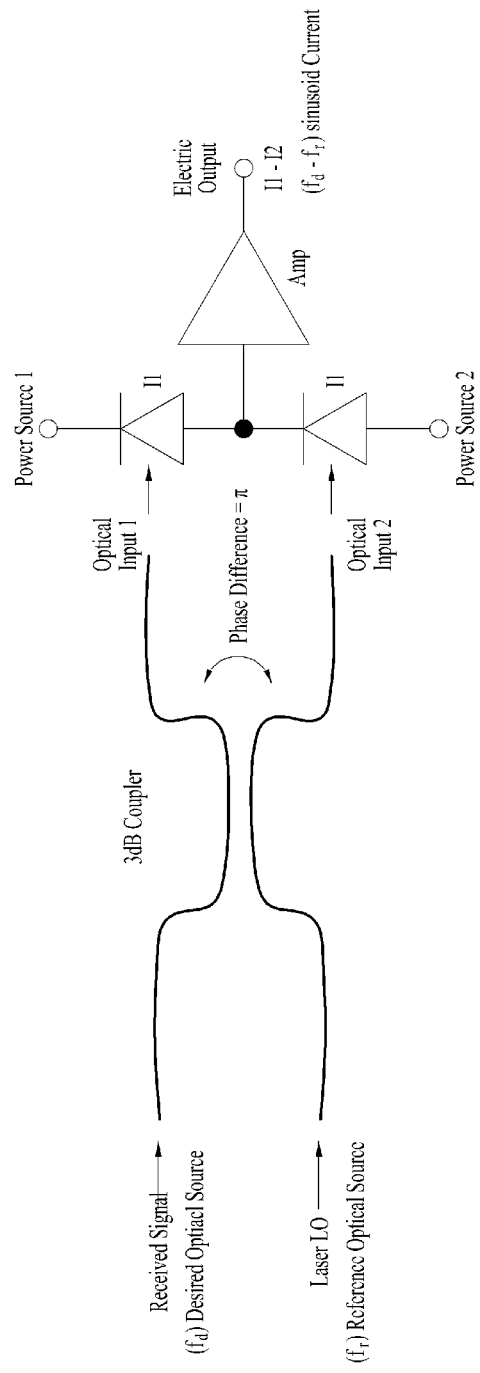

FIG. 50 is a diagram illustrating coherent detection performed through the above-described laser local oscillator (LO), 3 dB Coupler and balanced photodiode. First, the optical source that is generated in the laser LO and has a frequency (fr) as an intermediate frequency (IF) and the received desired beam (e.g., a received signal) having a frequency (fd) as an intermediate frequency are mixed through the 3 dB coupler, and are then branched (or split) into two parts at a ratio of 50:50. The branched signals may be input to balanced photodiodes, respectively. The balanced photodiode may output sinusoidal current waves having the intermediate frequencies (fd~fr). The sinusoidal current waves having the intermediate frequency corresponding to the frequencies (fd~fr) may facilitate electronic processing of the receiver.

2.3.4. Transimpedance Amplifier (TIA)

The TIA is a device for converting a received current into a voltage.

2.3.5. Analog-to-Digital Converter (ADC)

The ADC is a device for converting an analog signal into a digital signal.

2.4. Digital Signal Processor

A demodulator is a device that demodulates a signal modulated at the transmitter by a reverse process or a promised method.

2.5. OPS Array

The phase shifter used as the OAM demodulator is a device used for mode conversion into a Gaussian mode through phase reverse compensation for each OAM mode, and may have the following structure according to the relationship between the optical phase shifter (OPS) and the photodiode for OAM coherent detection.

2.5.2. 1:1 Relationship 2.5.2.1. Single OPS and Single Balanced PD

According to the present disclosure, a single phase shifter and a single photodiode can be used for conversion for each mode. Referring to FIG. 31, a spiral phase plate (SPP) may be provided as a single OPS, and a single photodiode may be provided. In this case, the received desired OAM beam is converted into a Gaussian beam through the SPP, and the total received optical signal of the Gaussian beam can be converted into an electrical signal by a single photodiode.

2.5.2.2. OPS Array and Photodiode Array

Figure 51:
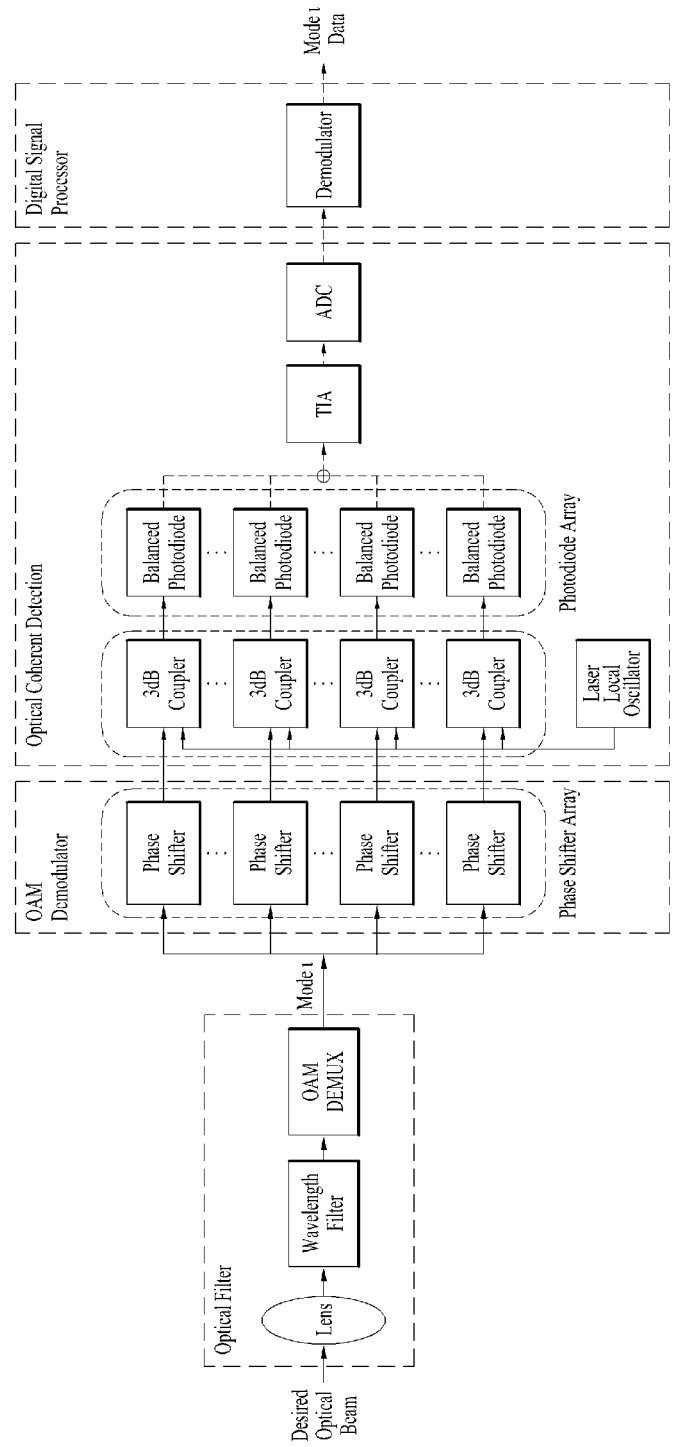
FIG. 51 is a diagram illustrating an OPS array and a photodiode array of the optical coherent receiver.

Referring to FIG. 51, the OPS array and the photodiode array may be used for conversion for each mode. In this case, the OPS array and the photodiode array may have a 1:1 relationship. In FIG. 51, considering the single optical direct detection chain, all of the electrical signals converted by the respective photodiodes are summed and converted into a voltage format through the TIA.

For example, at least one phase shifter may be included in the OPS array, and a photodiode array may be provided. Accordingly, the received desired OAM beam is converted into a plane wave form of the Gaussian beam through phase conversion for the corresponding region in each phase shifter, and the total received optical signal of the Gaussian beam can be converted into an electrical signal in each photodiode for the corresponding region.

2.5.3. 1:M Relationship

A single OPS and a photodiode array may be used for conversion for each mode. In this case, the single OPS and the photodiode array may have a 1:M relationship. A phase shifter may be provided as a spiral phase plate (SPP), and a photodiode array may be provided. Accordingly, the received desired OAM beam is converted into a plane wave form of the Gaussian beam through phase conversion for the entire area in the SPP, and the total received optical signal of the Gaussian beam is mixed with the laser LO signal for the corresponding region and converted into an electrical signal in each balanced photodiode.

2.5.4. N:1 Relationship

For conversion for each mode, when the OPS array and the single balanced photodiode are used and/or the photodiode array is used, the OPS array and the photodiode array may have the relationship of N:1. For example, the phase shifters may be used as the OPS array, and the photodiode (PD) array may be used. Accordingly, the received desired OAM beam is converted into a plane wave form of the Gaussian beam through phase conversion for the corresponding region in each OPS, and the total received optical signal of the Gaussian beam may be mixed with the laser LO signal for the corresponding area by the 3 dB coupler and then converted into the electrical signal by each balanced photodiode.

The relationship between the OPS used as the OAM demodulator and the photodiode for the OAM direct detection may have the following implementation characteristics (i), (ii), (iii), (iv), (v), (vi), and (vii). In more detail, i) as the number of OPSs increases, the implementation cost and size can be increased, ii) as the number of OPSs increases, the reception (Rx) performance can be increased when phase compensation is performed through control of each OPS, iii) as the number of OPSs increases, phase compensation can be performed without alignment of Tx-Rx devices when phase compensation is performed through control of each OPS, iv) as the number of balanced photodiodes increases, the implementation cost and size of each photodiode can be increased, and v) from the viewpoint of the total O-to-E conversion, as the number of balanced photodiodes increases, it is impossible to enlarge the reception range in which signals or beams can be received through O-to-E conversion in each photodiode. For example, when a single range is set to 1-10, 10 photodiodes can receive signals or beams within the range of 10-100. In addition, vi) as the number of balanced photodiodes increases, the performance requirements of each photodiode can be reduced, and vii) the optimal design can be performed through various combinations of the OPS array and the photodiode array.

2.6. Optical Coherent Detection Chain
2.6.1. Single Optical Coherent Detection Chain As described above with reference to FIG. 51, the electrical signals converted in the respective photodiodes through a single optical direct detection chain are summed and converted into a voltage format through the TIA.

2.6.2. Multiple Optical Coherent Detection Chain

Figure 52:
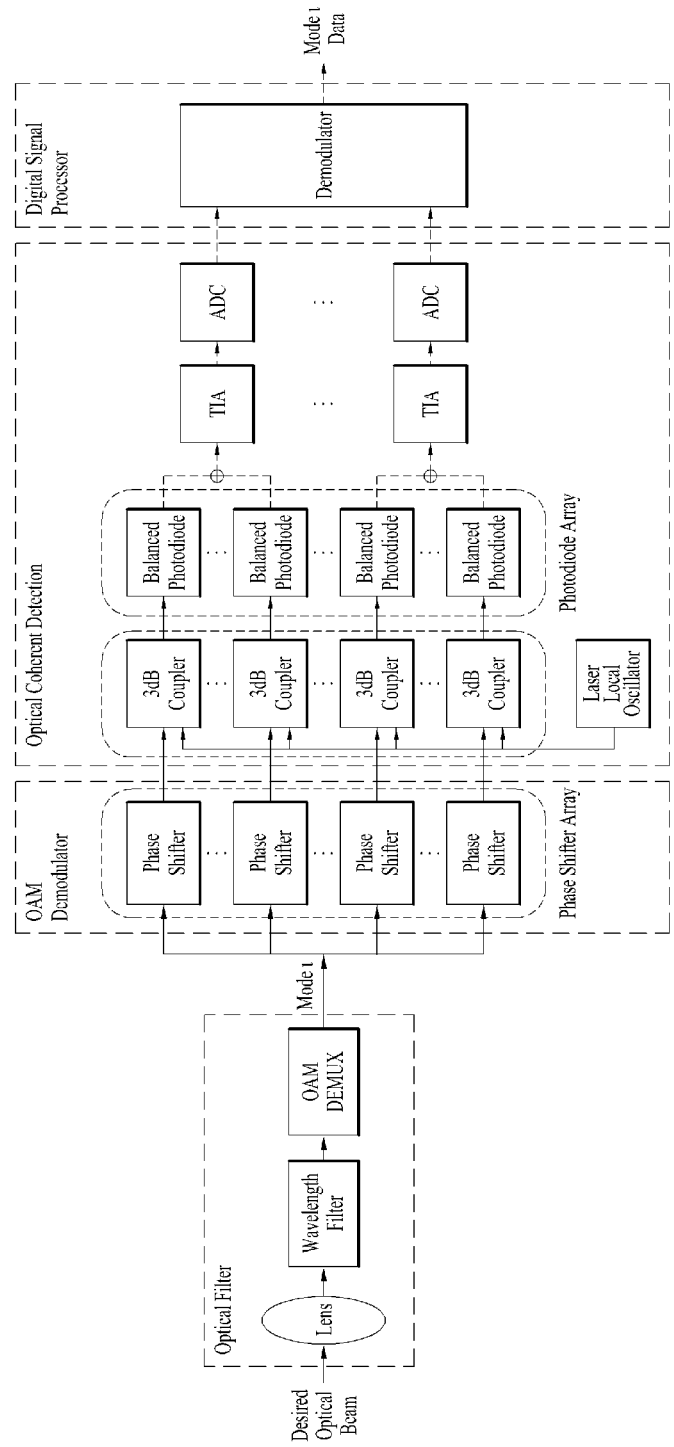
FIG. 52 is a diagram illustrating a multiple optical direct detection chain of the optical coherent receiver.

As shown in FIG. 52, the electrical signals converted in the respective balanced photodiodes are grouped and added, and the resultant signals can be converted into a voltage format through the TIA. The balanced photodiodes and the TIAs may have the relationship of N:1, so that the electrical signal can be converted into a digital signal for each chain. In this case, the diversity effect can be expected when decoding in the digital signal processor is performed based on each converted digital signal.

2.6.3. Full Optical Coherent Detection Chain

Figure 53:
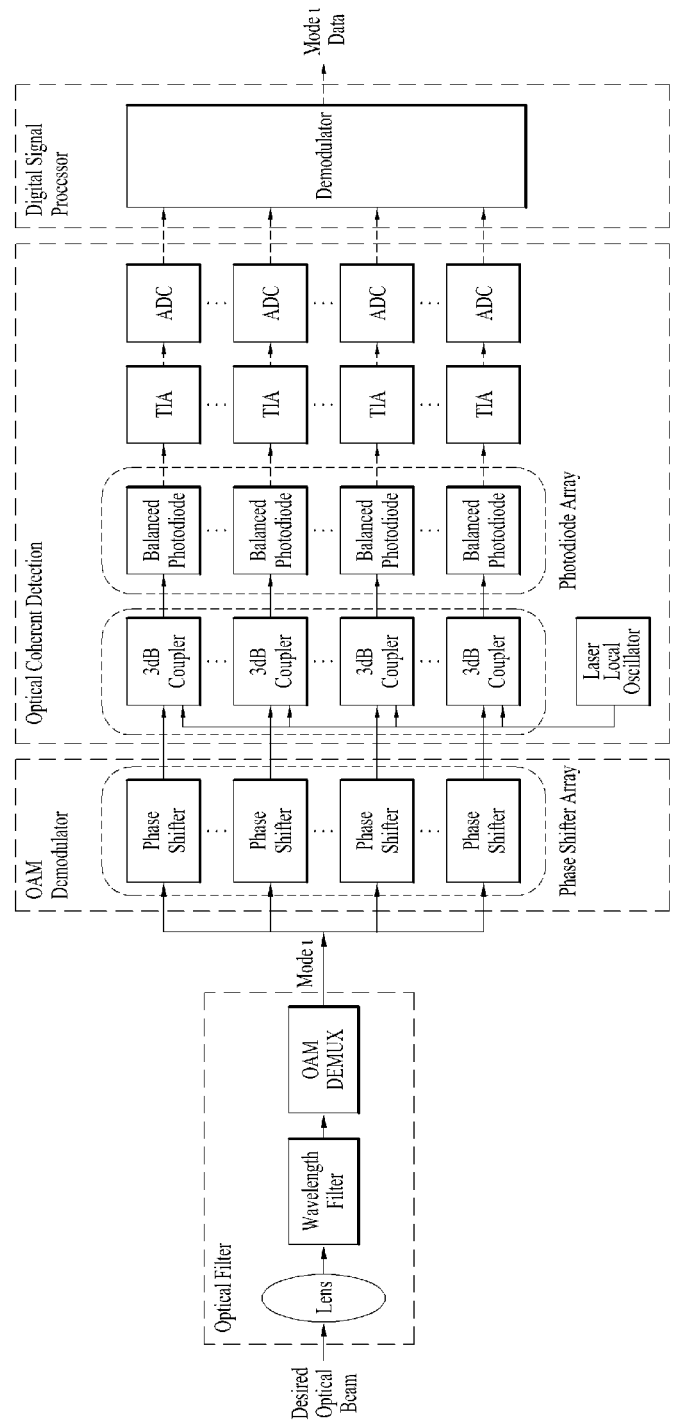
FIG. 53 is a diagram illustrating a full optical direct detection chain of the optical coherent receiver.

As shown in FIG. 53, the electrical signals converted in the respective balanced photodiodes can be converted into voltages through the respective TIAs. In this case, the balanced photodiodes and the TIAs may have the relationship of 1:1, and an electrical signal may be converted into a digital signal for each chain. In this case, the diversity effect can be maximized when decoding in the digital signal processor is performed based on each of the converted digital signals. However, the energy efficiency and cost efficiency may be reduced.

2.7. Analog-to-Digital Converter (ADC)

The electrical signals converted in the respective balanced photodiodes can be converted into voltages through the respective TIAs, and the converted voltages are added to digitize the electrical signal. In this case, signal decoding is performed in the digital signal processor based on the single digitized signal. Here, the diversity effect can be degraded, but the decoded result has advantages in terms of energy efficiency and cost. That is, the TIA chains and the ADCs may have the relationship of N:1.

2.8. Average Interference Tracking (AIT)

The optical coherent detection system may also have the AIT in the same manner as the optical direct detection system.

That is, AIT may be provided at a receiver, which can perform interference tracking by measuring constant interference. The AIT may be provided between the TIA and the ADC. Referring to FIG. 41, the AIT may measure interference at the output voltage of the TIA and remove the corresponding interference before reaching the ADC.

On the other hand, the AIT may operate periodically to measure interference. Referring to FIG. 42, an interference measurement reference (IMR) signal can be defined between the transmitter and the receiver for accurate interference measurement of the AIT. The IMR may be formed in a blank signal or a predefined sequence. The IMR may be transmitted at a predetermined period or at a predetermined resource position according to an engagement between the transmitter and the receiver. The period of the IMR may be established to be shorter than the period of change in interference. For example, in the period of the IMR, a training sequence and/or a blank sequence may be used with a shorter period than a change in the amount of sunlight due to the atmosphere (e.g., clouds) or reflection of an object, so that sunlight interference can be measured.

On the other hand, the TIAs and AITs may have the relationship of 1:1. For example, as shown in FIG. 43, individual interference may be measured for the output voltage of each TIA, and the measured interference may be removed, thereby increasing interference cancellation performance. In this case, the design cost and energy efficiency may be degraded. Alternatively, the TIAs and the AITs may have the relationship of N:1. For example, as shown in FIG. 44, all of the output voltages of the TIA are summed to measure total interference, and the measured interference is removed, so that the design cost and the energy efficiency can be increased. In contrast, interference cancellation performance may be degraded.

In the description of sections 2.1 to 2.8 above, it is obvious to those skilled in the art that combinations not mentioned for each case can be easily used. For example, the relationship between the OPS array and the photodiode array, the relationship between the photodiode array and the TIA chain, the relationship between the TIA chain and the AIT, and the relationship between the TIA and the ADC may be formed independently. Accordingly, according to the efficiency of implementation, the relationship of the respective constituent components can be established.

A receiving UE for receiving a signal in the optical wireless communication system according to the present disclosure may include a transceiver for receiving an optical signal of an OAM mode from a transmitting UE; a demodulator composed of at least one phase shifter; an optical-to-electrical (O-to-E) converter composed of at least one photodiode; and a processor coupled to the transceiver, the demodulator, and the O-to-E converter. The at least one phase shifter may convert an optical signal of the OAM mode into an optical signal of the Gaussian mode, and the at least one photodiode may convert an optical signal of the Gaussian mode into an electrical signal.

The at least one phase shifter may be a phase shifter array that forms each region in the demodulator, and the phase shifter array may control each of the OAM-mode optical signals reaching the respective regions.

On the other hand, the at least one photodiode is a photodiode array that forms each region in the O-to-E converter, and the electrical signals converted by the photodiodes array may be added to be processed by the processor.

The receiving UE may further include an OAM demultiplexer (DEMUX). The OAM demultiplexer may perform beam splitting of the optical signal such that each of the demodulator and the O-to-E converter can decode at least one OAM mode applied to the optical signal.

The receiving UE may further include a phase error corrector (PEC). The phase error corrector (PEC) may compensate for a change in wavefronts of the optical signals received through the transceiver.

The receiving UE may further include an average interference tracker (AIT). The average interference tracker (AIT) may measure interference generated in the electrical signal converted through the O-to-E converter and remove the measured interference from the electrical signal.

Meanwhile, the receiving UE may further include a laser oscillator (LO) for generating a reference optical resource of a frequency that is promised with the transmitting UE, and a coupler for mixing and branching the reference optical resource and the optical signal. The at least one photodiode may output a difference in current between optical signals branched by the coupler.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Best Mode for Implementing the Invention

Various embodiments of the disclosure have been described in the best mode for carrying out the disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is industrially applicable to various wireless communication systems such as 3GPP LTE/LTE-A and 5G systems.

The invention claimed is:

1. A first user equipment (UE) for receiving a signal in optical wireless communication comprising:
   a transceiver configured to receive an optical signal of an orbital angular momentum (OAM) mode from a second UE;
   an OAM demultiplexer;
   a demodulator composed of at least one phase shifter;
   an optical-to-electrical (O-to-E) converter composed of at least one photodiode; and
   a processor connected to the transceiver, the demodulator, and the O-to-E converter,
   wherein the OAM demultiplexer performs beam split of the optical signal such that each of the demodulator and the O-to-E converter decodes at least one OAM mode applied to the optical signal,
   wherein the at least one phase shifter converts the optical signal of the OAM mode into an optical signal of a Gaussian mode; and
   wherein the at least one photodiode converts the optical signal of the Gaussian mode into an electrical signal.

2. The first UE according to claim 1, wherein:
   the at least one phase shifter is a phase shifter array that forms respective regions in the demodulator,
   wherein the phase shifter array individually controls the optical signals of the OAM mode reaching the respective regions.

3. The first UE according to claim 1, wherein:
   the at least one photodiode is a photodiode array that forms respective regions in the O-to-E converter,
   wherein respective electrical signals converted through the photodiode array are summed and processed by the processor.

4. The first UE according to claim 1, further comprising:
a phase error corrector, wherein the phase error corrector compensates for a change in wavefront of the optical signal received through the transceiver.

5. The first UE according to claim 1, further comprising:
an average interference tracker (AIT), wherein the average interference tracker (AIT) measures interference generated in the electrical signal converted through the O-to-E converter, and removes the measured interference from the electrical signal.

6. The first UE according to claim 1, further comprising:
a laser oscillator configured to generate a reference optical resource of a frequency promised with the second UE; and
a coupler configured to mix and branch the reference optical resource and the optical signal,
wherein the at least one photodiode outputs a difference in current between optical signals branched by the coupler.

7. A method for receiving a signal by a first user equipment (UE) in optical wireless communication comprising:
receiving an optical signal of an orbital angular momentum (OAM) mode from a second UE;
performing beam split of the optical signal through an OAM demultiplexer such that each of a demodulator and an optical-to-electrical (O-to-E) converter decodes at least one OAM mode applied to the optical signal,
converting the optical signal of the OAM mode into an optical signal of a Gaussian mode through a demodulator composed of at least one phase shifter; and
converting the optical signal of the Gaussian mode into an electrical signal through the O-to-E converter composed of at least one photodiode.

8. The method according to claim 7,
wherein the at least one phase shifter is a phase shifter array that forms respective regions in the demodulator, and
wherein the optical signals of the OAM mode reaching the respective regions are individually controlled by the phase shifter array.

9. The method according to claim 7,
wherein the at least one photodiode is a photodiode array that forms respective regions in the O-to-E converter, and
wherein respective electrical signals converted through the photodiode array are summed and processed by the processor.

10. The method according to claim 7, further comprising:
by a phase error corrector, compensating for a change in wavefront of the optical signal received through a transceiver.

11. The method according to claim 7, further comprising:
by an average interference tracker, measuring interference generated in the electrical signal converted through the O-to-E converter, and removing the measured interference from the electrical signal.

12. The method according to claim 7, further comprising:
by a laser oscillator, generating a reference optical resource of a frequency promised with the second UE;
by a coupler, mixing and branching the reference optical resource and the optical signal; and
by the at least one photodiode, outputting a difference in current between optical signals branched by the coupler.

* * * * *